United States Patent [19]
Kanda et al.

[11] Patent Number: 5,610,807
[45] Date of Patent: Mar. 11, 1997

[54] POWER CONVERTING SYSTEM WITH A PLURALITY OF CHARGING CAPACITORS

[75] Inventors: Takashi Kanda; Kazuo Yoshida; Masahito Ohnishi, all of Kadoma, Japan

[73] Assignee: Matsushita Electric Works, Ltd., Osaka, Japan

[21] Appl. No.: 536,125

[22] Filed: Sep. 29, 1995

[30]  Foreign Application Priority Data

Oct. 14, 1994 [JP] Japan ................................. 6-249743
Nov. 25, 1994 [JP] Japan ................................. 6-290770
Nov. 25, 1994 [JP] Japan ................................. 6-290771
Nov. 25, 1994 [JP] Japan ................................. 6-291167

[51] Int. Cl.$^6$ ........................... H02M 1/12; H01H 47/00
[52] U.S. Cl. ............................. 363/43; 307/125
[58] Field of Search ................. 363/40, 43, 59, 363/60, 62, 95; 307/113, 125, 126, 129, 130, 131

[56]  References Cited

U.S. PATENT DOCUMENTS 4,203,151  5/1980  Baker ........................................ 363/43
4,523,269  6/1985  Baker et al. .............................. 363/43
5,414,614  5/1995  Fette et al. ............................... 363/59
5,444,310  8/1995  Kataoka et al. ......................... 307/125

FOREIGN PATENT DOCUMENTS 7123734  6/1995  Japan .

*Primary Examiner*—Matthew V. Nguyen
*Attorney, Agent, or Firm*—Leydig, Voit & Mayer

[57]  ABSTRACT

A power converting system rendering an applied voltage to a load to be a continuous voltage waveform, wherein a plurality of capacitors are charged so that their terminal voltages will reach predetermined voltages mutually different, the respective capacitors are sequentially connected respectively through a switching element to a series circuit of an inductor and a load-use capacitor, the load-use capacitor is charged with a resonance current of the capacitor and inductor, and the applied voltage to the load-use capacitor is made to be a pulsating waveform by properly adjusting the terminal voltages upon charging of the respective capacitors as well as change-over timing of the respective switching elements.

29 Claims, 36 Drawing Sheets

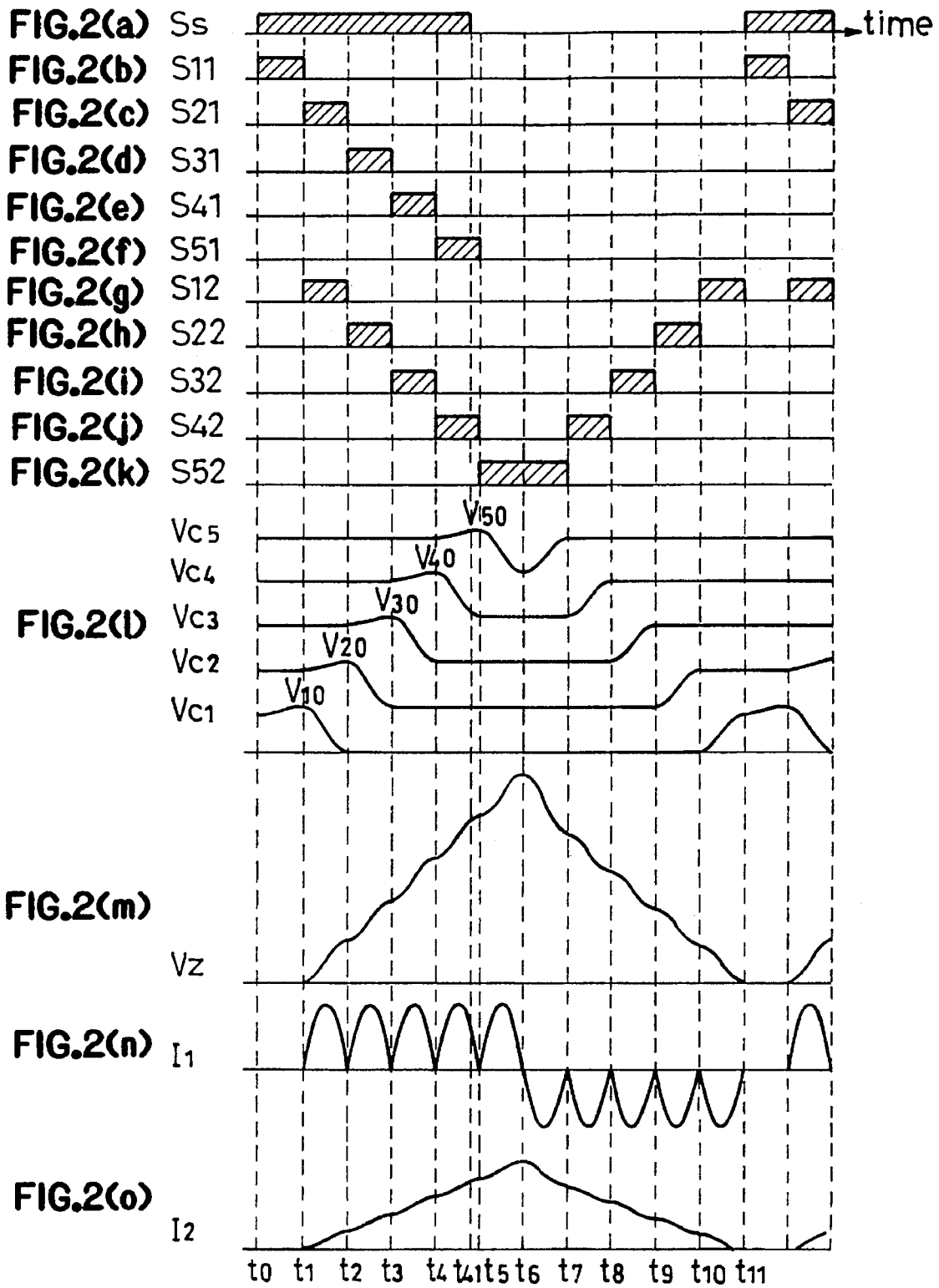

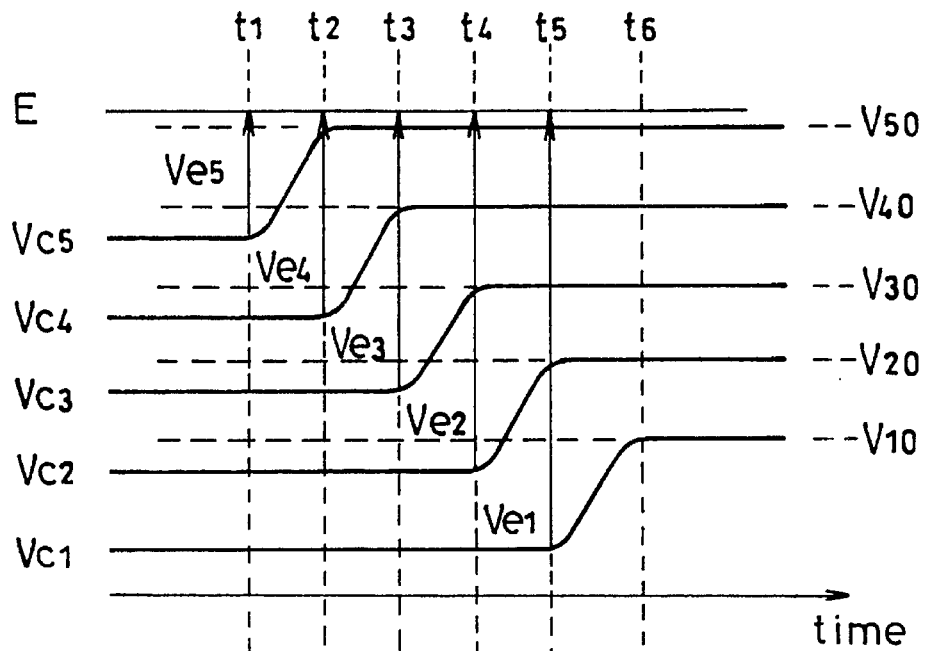
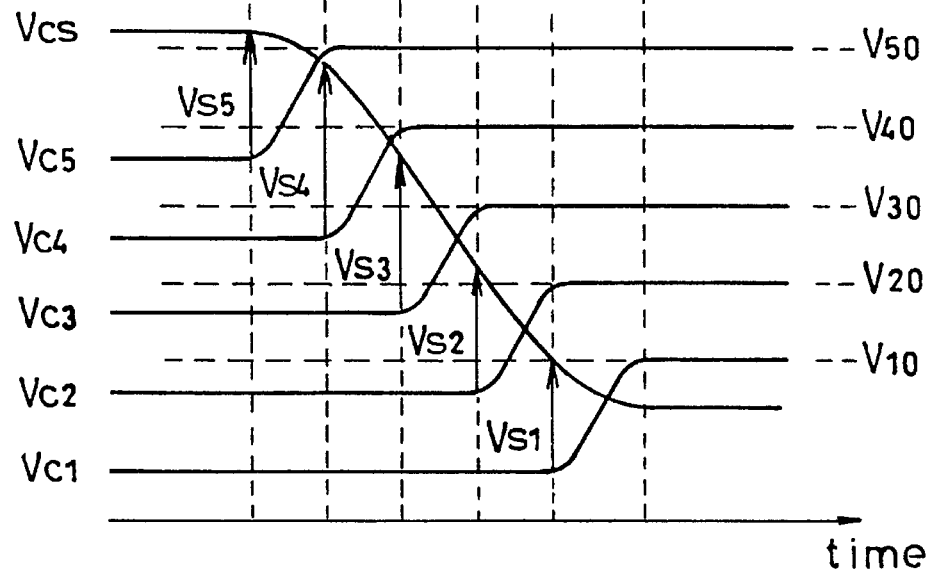

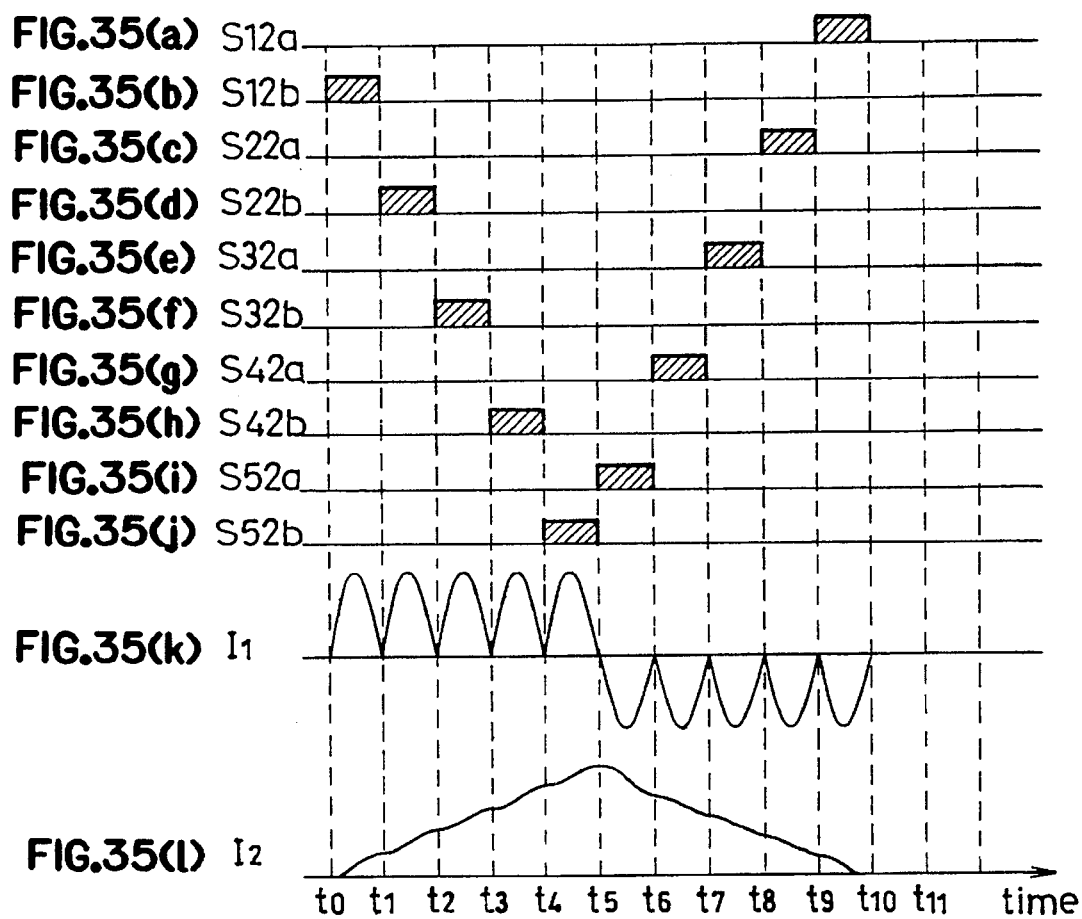

POWER CONVERTING SYSTEM WITH A PLURALITY OF CHARGING CAPACITORS

BACKGROUND OF THE INVENTION

This invention relates to a power converting system including a power converting circuit obtaining from a single-pole power source a power having a voltage waveform varying with time to a pulse shape or sinusoidal wave, with a minute capacitor as well as minute inductor and switching element employed.

DESCRIPTION OF RELATED ART

There have been provided power converting devices which supply a power to such load as a discharge lamp for stable lighting thereof by employing the minute capacitor and switching element. In U.S. patent application Ser. No. 07/881,293, for example, there has been described a power converting circuit which alternately executes at a high frequency an operation of charging the minute capacitor through the switching element with a power from a DC power source, and a further operation of supplying a power to the discharge lamp as the load from the charged minute capacitor through the switching element. Further, this U.S. Patent application discloses another power converting circuit which alternately executes at a high frequency an operation of supplying a power from the DC power source through a switching element to a series circuit of a minute capacitor and discharge lamp as the load, and an operation of supplying to the discharge lamp a power of an inverse polarity to that of the power previously supplied from the minute capacitor through the switching element. While these known circuit arrangements are capable of being made transformerless to be minimized in size and weight because of capability of stably lighting the discharge lamp with a current limiting effect provided through voltage boosting and dropping by varying connecting aspect of the minute capacitor, there arises a problem that the supply of the high frequency, pulse shape power to the discharge lamp as the load causes an electromagnetic noise to become remarkable, a crest factor to be low, and the life of the discharge lamp to be shortened.

Further, in Japanese Patent Laid-Open Publication No. 7-123734, there has been disclosed a circuit in which different input voltages are taken up through a plurality of switched capacitor circuits, the voltages are boosted at the respective switched capacitor circuits, the different voltages boosted are combined to have a pulsating voltage of a stepped waveform provided as an output, and an AC power is supplied to the discharge lamp load through an LC filter circuit and a bridge circuit. While this circuit allows an inductor and capacitors of small withstand voltage to be utilizable because the voltage of stepped waveform close to an output waveform of the LC filter circuit so as to render the size and weight minimized and the electromagnetic noise to be reduced and an output substantially of a sinusoidal wave to be provided, there has been such problem that, as the inductor and capacitor of the LC filter circuit are inserted in series with the discharge lamp load, a resonance frequency reaches substantially the same level as the frequency of the AC output and the L and C values are substantially the same level as those of the resonance inverter circuit.

SUMMARY OF THE INVENTION

A primary object of the present invention is, therefore, to overcome the foregoing problems of the known power converters, and to provide a power converting system of a switched capacitor type for supplying from a DC power source a smooth pulsating current or a smooth AC power, wherein the L and C values can be made smaller than a resonance inverter, by elevating a resonance frequency of an LC resonance circuit which smooths the stepped pulsating current supplied by the switched capacitor circuit to be higher than a frequency of AC output, so that the electromagnetic noise can be minimized and passive parts for the power conversion can be enough minimized for being made into one-chip.

According to the present invention, the above object can be realized by means of a power converting system comprising a switched capacitor circuit in which a plurality of capacitors are charged with a power from a single-pole power source to have different voltages and are switched to provide and output of a stepped pulsating current, and a load section consisting of an inductor connected in series between a capacitor connected in parallel with a load and the said switched capacitor circuit, the arrangement being such tnat a closed circuit of the switched capacitor circuit and load section will have a resonance frequency synchronized with a timing at which the capacitors forming the switched capacitor circuit are switched.

Other objects and advantages of the present invention shall bacome clear as following description of the invention advances with references to respectiv embodiments shown in accompanying drawings.

BRIEF DESCRIPTION OF THE DRAWINGS

FIGS. 2(a) to 2(o) are operational waveform diagrams of Embodiment 1 of FIG. 1;

FIGS. 11(a) and 11(b) are operational waveform diagrams for Embodiment 8 of FIG. 10;

FIGS. 35(a) to 35(l) are operational waveform diagrams for Embodiment 23 of FIG. 33;

While the present invention shall now be described with reference to the respective embodiments shown in the accompanying drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

EMBODIMENT 1

Figure 1:
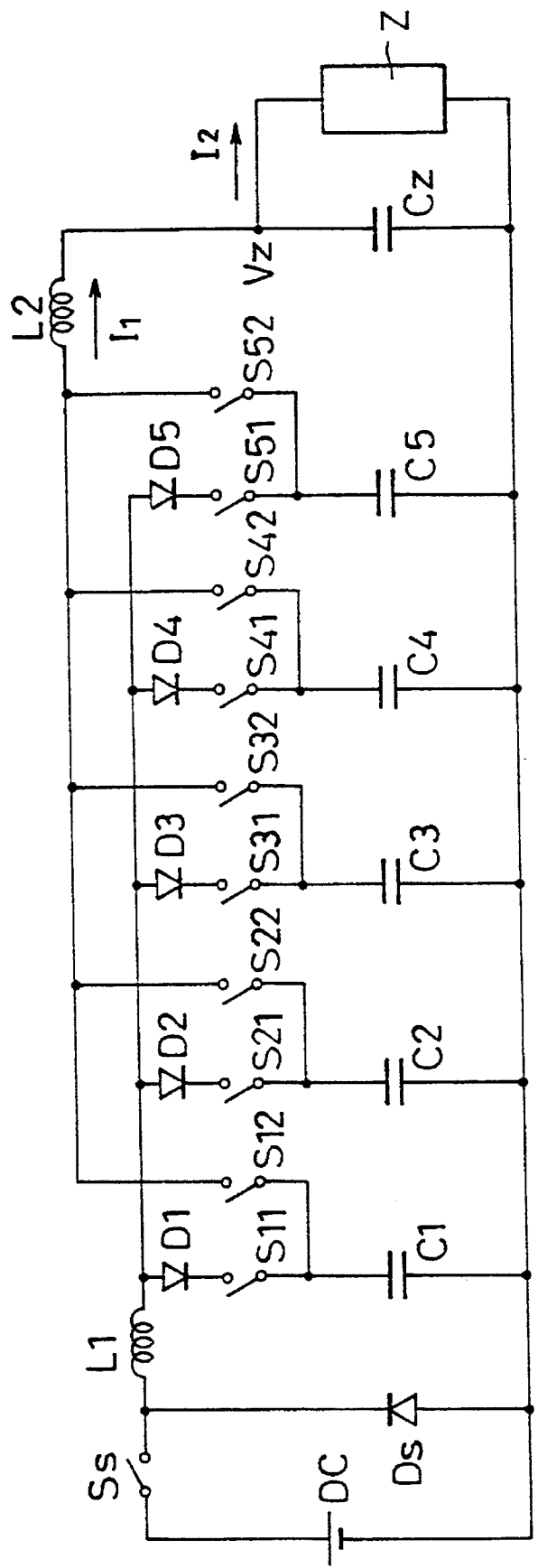
FIG. 1 shows in a circuit diagram Embodiment 1 of the power converting system according to the present invention.

In FIG. 1, there is shown Embodiment 1 according to the present invention, in which a DC power source is employed, and an arrangement for applying a voltage varying into a pulsating current form with time to a load. In this case, the switched capacitors are employed for the power converting circuit, such that first set of five series circuits comprising respectively each of capacitors C1–C5, switching elements S11–S51 and diodes D1–D5 is connected mutually in parallel and as a whole to the DC power source DC through an inductor L1 and a switching element Ss, and second set of five series circuits comprising respectively each of the capacitors C1–C5 and switching elements S12–S52 is mutually connected in parallel and as a whole to a load Z through an inductor L2. Further, a diode Ds is connected in parallel with a series circuit of the power source DC and switching element Ss, while a load-use capacitor Cz is connected in parallel with the load Z. The inductors L1 and L2 employed here are of an extremely small inductance and are arranged for resonantly transmitting the power to have the power transmission efficiency improved. Here the respective switching elements S11–S51 and S12–S52 are operated as controlled in a manner as will be described later by means of an optimum control circuit (not shown) which monitors terminal voltages of the respective capacitors C1–C5 so that, when a predetermined terminal voltage for the respective capacitors C1–C5 is reached while charging these capacitors, the charging will be ceased. For the respective switching elements Ss, S11–S51 and S12–S52, a MOSFET, bipolar transistor or the like may be employed as set to have a predetermined ON resistance when turned ON.

Next, the operation of the circuit shown in FIG. 1 shall be explained with reference also to FIG. 2. For the operation of the switching elements Ss, S11–S51 and S12–S52, hatched periods in FIGS. 2(a)–2(k) denote their ON while other periods show their OFF. At time t0, first, the switching elements Ss and S11 only are turned ON as in FIGS. 2(a) and 2(b). Thus the capacitor C1 is charged through the switching element Ss, inductor L1, diode D1 and switching element S11 and, as the terminal voltage Vc1 of the capacitor C1 reaches a voltage V10 at time t1 as in FIG. 2(l), the switching element S11 is turned OFF while the switching element Ss is maintained ON. Thereafter, the switching element S21 is made ON as in FIG. 2(c) and the capacitor C2 is charged until its terminal voltage Vc2 reaches V20 (>V10) at time t2. Similarly, as in FIGS. 2(b)–2(f), the switching elements S11–S51 are sequentially turned ON to have the respective capacitors C1–C5 charged so that their terminal voltages Vc will reach the respective predetermined levels V10, V20, V30, V40 and V50 (V10<V20<V30<V40<V50). In respect of the capacitor C5 in this case, as shown in FIGS. 2(a), 2(f) and 2(l), the switching element Ss is turned OFF at time t41 immediately before the predetermined level V50 is reached by the terminal voltage of the capacitor C5, so that the capacitor C5 will be charged through a path of the inductor L1, diode D5, switching element S51, capacitor C5 and diode Ds, with accumulated energy in the inductor L1 also utilized. As has been referred to, it is enabled to charge the respective capacitors C1–C5 to have the different terminal voltages Vc with the use of the single power source DC. Since the respective capacitors C1–C5 are charged resonantly through the inductor L1, here, it is possible to reduce any power loss occurring upon transmitting the power.

To the load Z, on the other hand, the power is sequentially supplied from the capacitors C1–C5 the charging of which has been completed. That is, simultaneously with the completion of the charge of the capacitor C1 at time t1, the switching element S12 is made ON as shown in FIG. 2(g), and the power is supplied from the capacitor C1 through the inductor L2 to the load-use capacitor Cz and load Z. Upon this power supply from the capacitor C1 to the load Z, a resonance circuit is formed by a parallel circuit of the load Z and load-use capacitor Cz as well as the inductor L2 and capacitor C1, and such resonance current I1 as in FIG. 2(n) is caused to flow through the inductor L2. Consequently, the terminal voltage Vz of the load-use capacitor Cz rises resonantly as in FIG. 2(m) while the terminal voltage Vc1 of the capacitor C1 drops as in FIG. 2(l). Provided now that the impedance of the load Z is sufficiently high and the capacitor C1 and load-use capacitor Cz are substantially equal in the capacity to each other, then the terminal voltage Vz of the load-use capacitor Cz is caused to rise to a voltage close to the terminal voltage V10 set for the capacitor C1, and the terminal voltage Vc1 of the capacitor C1 is caused to drop to a level close to the original terminal voltage Vz (=0 V) of the load-use capacitor Cz. When the terminal voltage Vz of the load-use capacitor Cz substantially reaches V10, the load-use capacitor Cz discharges this time, and the capacitor C1 is charged. Here, at the time when the terminal voltage Vz of the load-use capacitor Cz has substantially reached the peak (time t2), the switching element S12 is turned OFF. Since the charging of the capacitor C2 has been completed at time t2, the switching element S22 is turned ON as in FIG. 2(h). At this time, a resonance circuit is formed by the capacitor C2, inductor L2, load-use capacitor Cz and load Z so that, so long as the capacitor C2 and load-use capacitor Cz are substantially equal to each other in the capacity, the terminal voltage of the load-use capacitor Cz rises to a level close to the terminal voltage C20 set for the capacitor C2 as in FIG. 2(m) at time t3, while the terminal voltage Vc2 of the capacitor C2 drops to a level close to the original terminal voltage V10 of the load-use capacitor Cz as in FIG. 2(l). With sequential repetition of such operation, the terminal voltage Vz of the load-use capacitor Cz is caused to sequentially rise as in FIG. 2(m) to reach, at time t6, a level close to the terminal voltage V50 set for the capacitor C5.

Even after the time t6 at which the terminal voltage Vz of the load-use capacitor Cz has reached substantially the peak, the switching element S52 kept in ON state as in FIG. 2(k) causes the resonance current I1 to flow through the inductor L2 in inverse direction, and the terminal voltage Vz of the load-use capacitor Cz gradually drops as shown in FIG. 2(l). Since this terminal voltage Vz of the load-use capacitor Cz drops to a level close to the terminal voltage V40 of the capacitor C4 at time t7, the switching element S52 is turned OFF at this time and the switching element S42 is made ON as in FIG. 2(j). Since at this time the terminal voltage Vc4 of the capacitor C4 is close to V30 and the terminal voltage Vz of the load-use capacitor Cz is close to V40, there flows the resonance current I1 from the load-use capacitor Cz towards the capacitor C4, the terminal voltage Vz of the load-use capacitor Cz drops to a level close to V30, and the terminal voltage Vc4 of the capacitor C4 rises to a level close to V40. With the switching elements S52-S12 sequentially turned ON in this way, it is enabled to gradually drop the terminal voltage Vz of the load-use capacitor Cz until the voltage Vz eventually reaches substantially 0 V. Here, the OFF timing of the respective switching elements S11–S51 and S12–S52 can be determined by detecting zero-cross point of the resonance current I1.

With such control as in the above of the switching elements Ss, S11–S15 and S12–S52, it is made possible to vary in smooth manner the terminal voltage Vz of the load-use capacitor Cz as in FIG. 2(m). Further, when the load Z is resistive, a load current I2 varies in smooth manner in proportion to the terminal voltage Vz of the load-use capacitor Cz as in FIG. 2(o), and eventually any higher harmonic distortion of the load current I2 flowing through the load Z can be reduced. Here, the resonance frequency of the respective resonance circuits referred to in the above becomes higher than a frequency corresponding to the cycle (t0–t11) in which the terminal voltage Vz of the load-use capacitor Cz varies, so that the time constant determined by the capacitors C1–C5 or the inductors L1 and L2 can be set small. In addition, a potential difference across both ends of the inductor L2 is of an extent of a difference in the terminal voltage between adjacent ones of the capacitors C1–C5, for example, between V50 and V40 of C5 and C4, and it is possible to employ an inductor of a low withstand voltage as compared with the applied voltage to the load Z. Further, as the power is transmitted through the inductors L1 and L2, the operation can be realized at a higher efficiency as compared with an event where ordinary switched capacitors are used without any inductor.

Further, with the foregoing arrangement of Embodiment 1, the charging of the respective capacitors C1–C5 from the DC power source DC is performed prior to charging and discharging between the respective capacitors C1–C5 and load-use capacitor Cz within each cycle in which the terminal voltage Vz of the load-use capacitor Cz varies (among the periods t0–t11 of each cycle, prior to time t1 for the capacitor C1, prior to time t2 and after time t10 for the capacitor C2, prior to time t3 and after time t9 for the capacitor C3, prior to time t4 and after time t8 for the capacitor C4, and prior to time t5 and after time t7 for the capacitor C5), so that the voltage waveform of the terminal voltage Vz of the load-use capacitor Cz can be made substantially symmetrical between the rising side and the dropping side.

The number of the capacitors C1–C5 forming such switched capacitors as in the above may not be particularly limited but may be smaller or larger as required than that in the foregoing Embodiment. However, the larger number of the capacitors C1–C5 enables the voltage variation to be smoother and renders the difference of the terminal voltage between adjacent ones of the capacitors, for example, C5 and C4 to be smaller, so that an inductor of a smaller withstand voltage can be used as the inductor L2.

As has been referred to in the above, a plurality of the capacitors C1–C5 are charged to have the respective terminal voltages Vc1–Vc5 mutually differentiated even with the single power source DC employed, and the load-use capacitor Cz is charged sequentially from the respective capacitors C1–C5 through the inductor L2 for supplying the power to the load Z connected in parallel to the load-use capacitor Cz, so that the applied voltage to the load Z can be varied in smooth manner with time. As will be clear from the above description, a charge section is constituted by the DC power source DC, switching elements Ss and S11–S51, inductor L1, diodes D1–D5 and control circuit.

EMBODIMENT 2

Figure 3A:
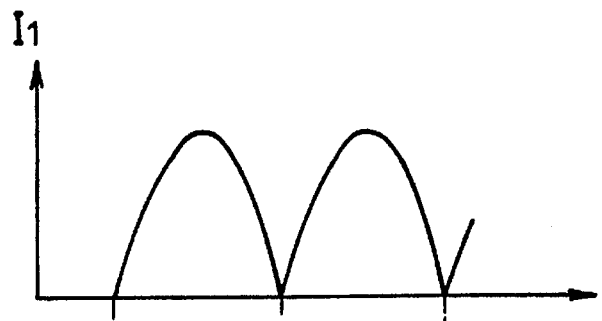
FIGS. 3(a)–3(b) and 4(a)–4(b) are explanatory operation diagrams of Embodiment 2 according to the present invention.
Figure 3B:
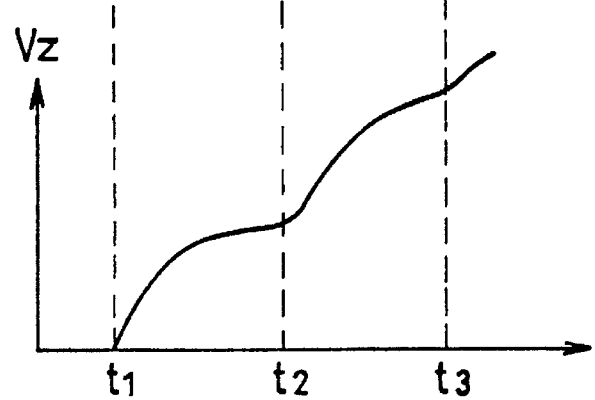

This Embodiment 2 employs the same circuit arrangement as that of Embodiment 1, but the timing of turning OFF the respective second group switching elements S12–S52 is made different from that in the case of Embodiment 1. In the case of Embodiment 1, the respective switching elements are turned OFF at the zero-cross points of the resonance current I1 flowing through the inductor L1 as in FIG. 3(a), and the rise (or fall) of the terminal voltage Vz of the load-use capacitor Cz is continued as sequentially taken over from one of the capacitors C1–C5 substantially upon ceasing of the rise due to the charge from this one capacitor (or of the fall due to the discharge to this one capacitor) to the next one of the capacitors C1–C5 (for example, from C1 to C2 or from C2 to C1). During such operation, the rising rate (or the falling rate) of the terminal voltage Vz of the load-use capacitor Cz abruptly changes at the moment of change-over between the respective switching elements S12–S52.

Figure 4A:
Figure 4B:
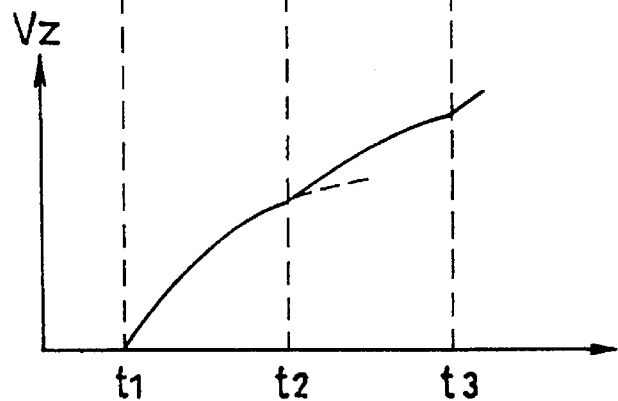

In the present Embodiment 2, therefore, the charging (or discharging) of the load-use capacitor Cz is executed as taken over from one to the next of the capacitors C1–C5, for example, from C1 to C2 (or from C2 to C1) by turning OFF the respective switching elements S12–S52 as shown in FIG. 4(a), so that the abrupt change in the rising (or falling) rate of the terminal voltage Vz of the load-use capacitor Cz at the time of change over between the switching elements S12–S52 can be restrained and the voltage waveform can be more smoothed as in FIG. 4(b). That is, it is enabled to more optimumly restrain the higher harmonic distortion than in Embodiment 1 when the ON/OFF timing of the switching elements S12–S52 is controlled as in the present Embodiment 2. Other constituents and operation are the same as those in Embodiment 1.

EMBODIMENT 3

This Embodiment 3 is arranged for varying the terminal voltage of the load-use capacitor Cz in a sinusoidal waveform. While in the foregoing Embodiment 1 the values of the terminal voltage Vcn of the respective capacitors C1–C5 upon being charged from the DC power source DC are so set as to be $$V10 \approx V20-V10 \approx V30-V20 \approx V40-V30 \approx V50-V40,$$

the values in the present Embodiment 3 are set to be $$V10 > V20-V10 > V30-V20 > V40-V30 > V50-V40.$$

Figure 5:
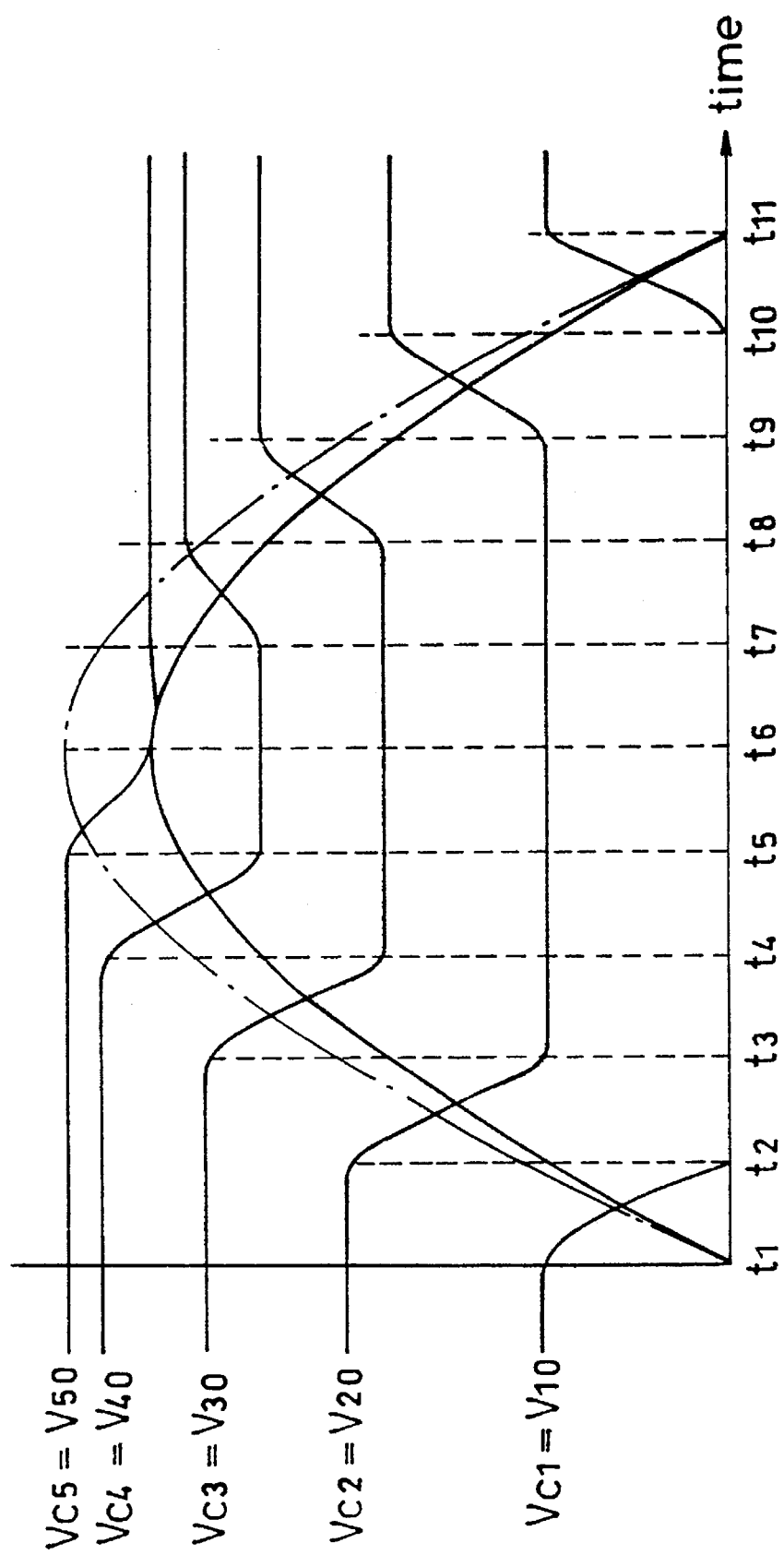
FIG. 5 is an explanatory operation diagram of Embodiment 3 according to the present invention.

In order to set the terminal voltage Vcn of the respective capacitors C1–C5 in such relationship as in the above, the present Embodiment 3 sets, with respect to the terminal voltage Vz of the load-use capacitor Cz, such waveform as shown in FIG. 5 by a single-dot chain line to be equal in the cycle to but slightly larger in the amplitude than such target waveform as shown in FIG. 5 by a solid line is set, the terminal voltage Vcn is determined as based on the set waveform for each of the capacitors C1–C5 to be thereby reached, and the control circuit adjusts the required charging time of the respective capacitors C1–C5 for attaining the set terminal voltage Vcn. The terminal voltage Vc2 of the capacitor C2, for example, is required to reach at time 2 a voltage at time t3 of the set waveform of the chain line in FIG. 5. Further, the terminal voltage Vc5 of the capacitor C5 is set to reach at time t5 a peak value of the set waveform of the chain line in FIG. 5. Thus the arrangement is so made that, by setting the terminal voltage Vcn of the respective capacitors C1–C5 as set forth in the above, the applied voltage to the load Z is varied substantially into the sinusoidal waveform, while rendering the ON/OFF timing of the switching elements S12–S52 for the charging and discharging between the capacitors C1–C5 and the load-use capacitor Cz to take place substantially at equal time intervals.

Here, by determining the terminal voltage Vcn of the respective capacitors C1–C5 on the basis of the set waveform larger in the amplitude than the target waveform, it is made possible to compensate for any drop in the terminal voltage Vz of the load-use capacitor Cz due to a power consumption at the load Z. With the employment of this setting arrangement, further, the terminal voltage Vz of the load-use capacitor Cz can be maintained at the target value even when the switching element Sj2 is changed over prior to the zero-cross point of the resonance current I1 as in Embodiment 2. Since as in the foregoing the terminal voltage Vcn is set upon the charging of the respective capacitors C1–C5 from the power source DC, the terminal voltage Vz of the load-use capacitor Cz can be varied into the sinusoidal waveform, and the higher harmonic distortion in the applied voltage and flowing current to the load Z can be more reduced. Other constituents and operation are the same as those in Embodiment 1.

EMBODIMENT 4

Figure 6:
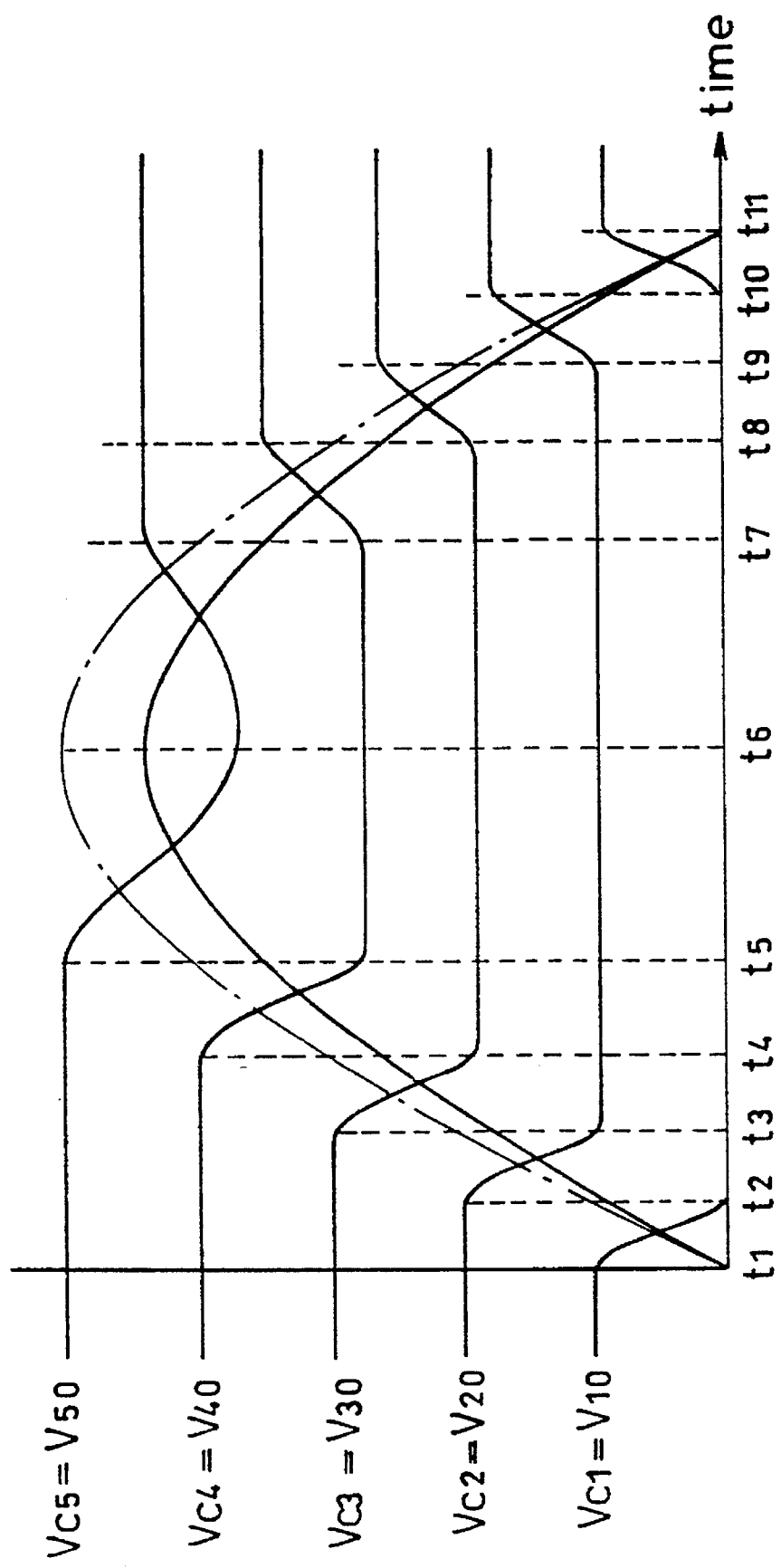
FIG. 6 is an explanatory diagram for the operation of Embodiment 4 according to the present invention.

While this Embodiment 4 is also to have the terminal voltage Vz of the load-use capacitor Cz varied into the sinusoidal waveform as in Embodiment 3, the present Embodiment 4 is different from Embodiment 3 in the controlling process. That is, while in Embodiment 3 the difference in the terminal voltage Vc between adjacent pairs of the capacitors C1–C5 is varied, the present Embodiment 4 employs the same circuit arrangement as in Embodiment 1 of FIG. 1 to maintain the difference in the terminal voltage Vc between the adjacent pairs of the capacitors to be substantially constant, whereas the control is so made that the ON periods of the respective switching elements S12–S52 disposed between the respective capacitors C1–C5 and the load-use capacitor Cz are mutually different, and the terminal voltage Vz of the load-use capacitor Cz is to be thereby varies into the sinusoidal waveform. Here, the setting process of the target values of the terminal voltages Vc1–Vc5 of the respective capacitors C1–C5 is the same as that in Embodiment 3, according to which such waveform as shown by a single-dot chain line as in FIG. 6 and slightly larger in the amplitude than such target waveform of the terminal voltage Vz of the load-use capacitor Cz as shown by a solid line in FIG. 6 is first set, and the target values of the terminal voltages Vc1–Vc5 of the respective capacitors C1–C5 at respective time t2, t3, t4, t5 and t6 may be determined on the set waveform of the chain line.

Further, in the arrangement of Embodiment 3, the terminal voltages Vc1–Vc5 of the respective capacitors C1–C5 are made different and varying width of the voltage at time width of changing over the switching elements S12–S52 is made larger on the lower voltage side than the higher voltage side, whereby the potential difference between both ends of the inductor L2 is increased, and the inductor L2 employed is required to be the one higher in the withstand voltage that in Embodiment 1. In the arrangement of Embodiment 4, on the other hand, the varying width of the voltage at time width of changing over the switching elements S12–S52 is made substantially constant (i.e., the voltage difference between such adjacent ones as the terminal voltages Vc1 and Vc2 of the capacitors C1 and C2 is constant), so that the potential difference bewteen the both ends of the inductor L2 can be maintained substantially constant and, eventually, the inductor L2 of the low withstand voltage of the same extent as in Embodiment 1 may be employed. Other constituents and operation are the same as in Embodiment 1.

EMBODIMENT 5

This Embodiment 5 also employs the same arrangement as Embodiment 3 and 4, as shown in FIG. 1, to have the terminal voltage Vz of the load-use capacitor Cz varied to the sinusoidal waveform. For this purpose, the respective capacitors C1–C5 employed here are made different in the capacity, so that their relationship will be C1<C2<C3<C4<C5. That is, the capacity of these capacitors C1–C5 sequentially connected to the load-use capacitor Cz is made smaller for the one connected in the period in which the terminal voltage Vz of the load-use capacitor Cz is lower. Accordingly, the resonance frequency in the periods in which the respective capacitors C1–C5 are connected to the load-use capacitor Cz is caused to be varied for every one of the capacitors C1–C5, and the voltage of sinusoidal waveform is obtained by lowering the resonance frequency in the periods in which the terminal voltage Vz of the load-use capacitor Cz is higher so as to render the voltage variation to be gradual. In contrast, the resonance frequency in the periods of lower terminal voltage of the load-use capacitor Cz is made higher so that the voltage variation will be abrupt. Other constituents and operation are the same as in Embodiment 1.

EMBODIMENT 6

Figure 7:
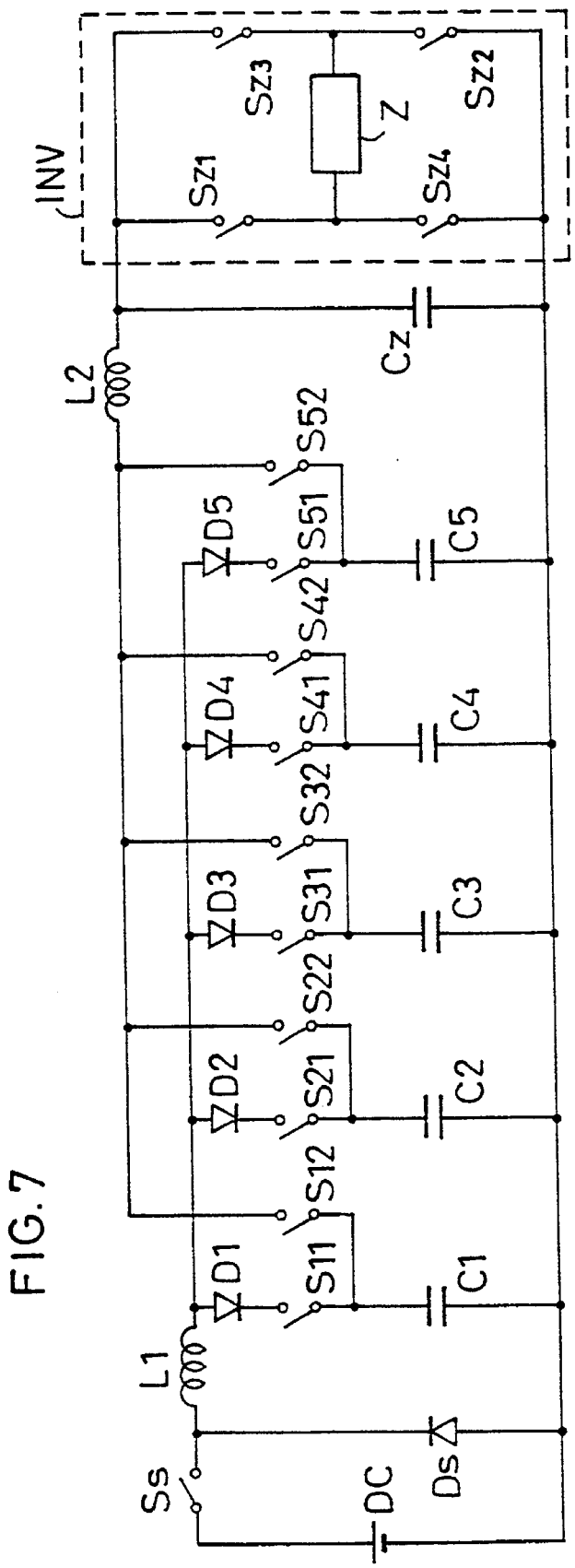
FIG. 7 shows in a circuit diagram Embodiment 6 according to the present invention.

As shown in FIG. 7, this Embodiment 6 employs, as the load Z, the same full-bridge inverter circuit INV as that has been described with reference to the prior art. That is, four switching elements Sz1–Sz4 are employed in bridge connection, so that two switching elements Sz1 and Sz2 (or Sz3 and Sz4) connected in series through the load Z are simultaneously made ON while the switching elements Sz1 and Sz4 (or Sz3 and Sz2) are alternately turned On and OFF so as to cause an alternating current to flow to the load Z. For such inverter circuit INV, any known one can be employed, and it is made possible to apply an AC voltage of the sinusoidal waveform to the load Z by the use of such inverter circuit INV, as the load Z arranged as in Embodiments 1 through 5.

EMBODIMENT 7

Figure 8:
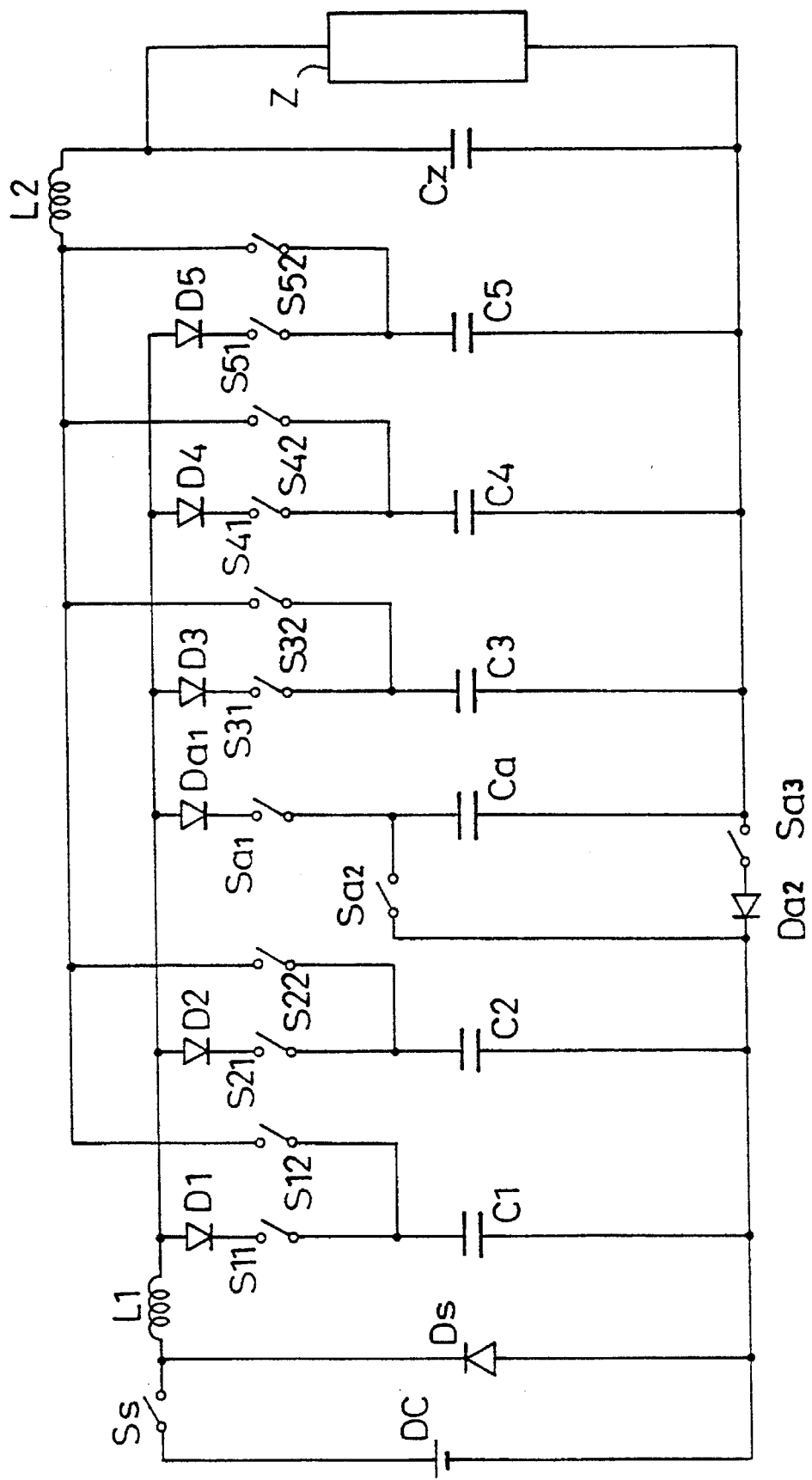
FIG. 8 is a circuit diagram of Embodiment 7 according to the present invention.

This Embodiment 7 has such arrangement as shown in FIG. 8, in which a series circuit of a capacitor Ca, switching element Sa1 and diode Da1 as well as a further series circuit of two switching elements Sa2 and Sa3 and a diode Da2 and connected in parallel with the capacitor Ca are added to the circuit of Embodiment 1. The series circuit of the capacitor Ca, switching elements Sa1 and diode Da1 is connected in parallel to the series circuit of the capacitor C3, switching element S31 and diode D3, while in the further series circuit of the switching elements Sa2 and Sa3 and diode Da2 a partial series circuit of the switching element Sa3 and diode Da2 is inserted between one ends of adjacent two capacitors C2 and C3, while the diode Da2 is connected at its cathode to the one end of the capacitor C2.

With this arrangement, it is intended to set the peak voltage of the load-use capacitor Cz to be higher than the source voltage E of the power source DC, and a terminal voltage Vca of the capacitor Ca is added to the power from the source DC for charging the capacitors C3–C5 among the capacitors C1–C5, so that the terminal voltages Vc1–Vc5 can be made higher than the source voltage E of the power source DC. For the capacitor Ca, its terminal voltage Vca is set to be Va0.

Figure 9:
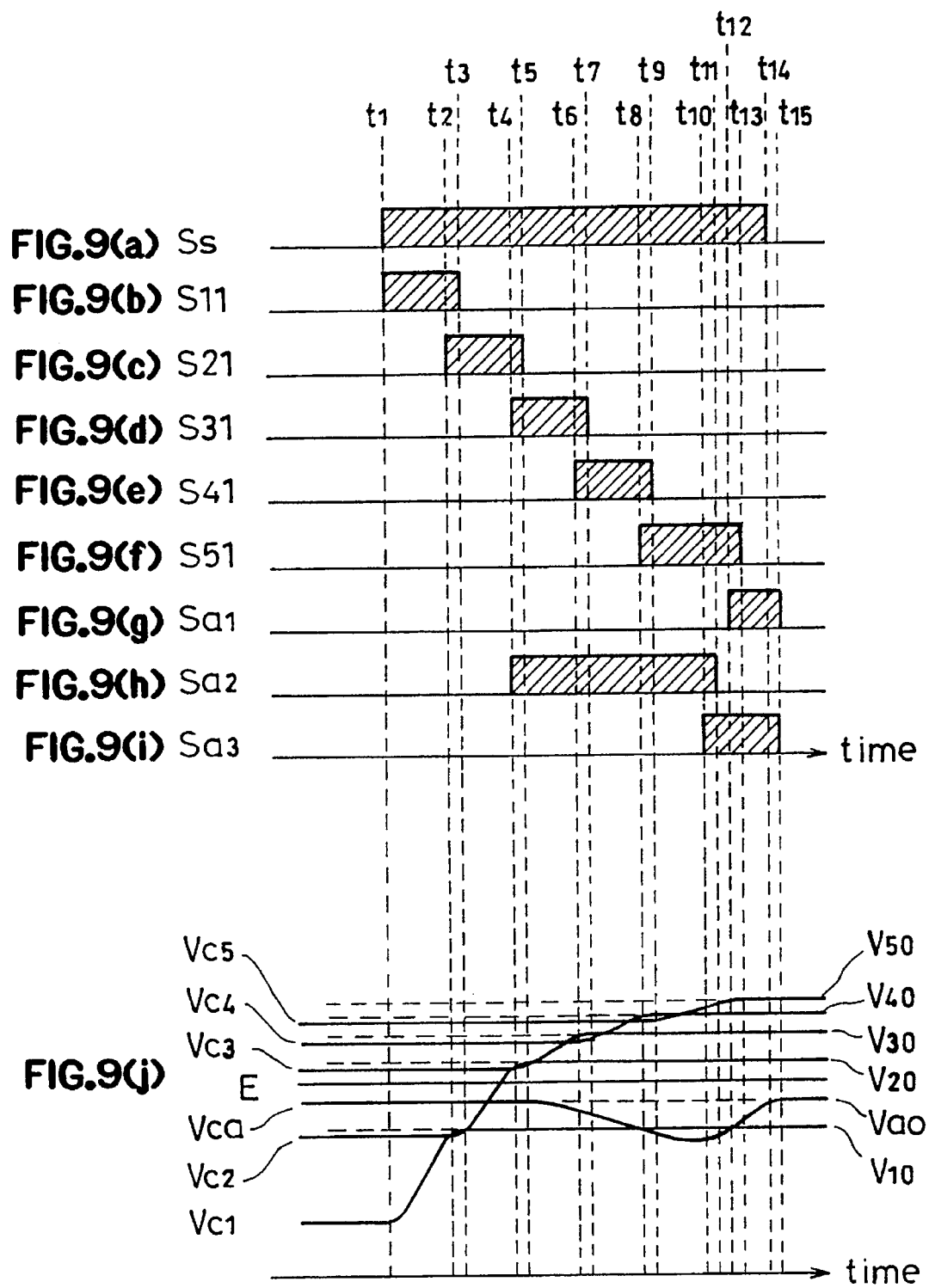
FIGS. 9(a) to 9(j) are operational waveform diagrams for Embodiment 7 of FIG. 8.
Figure 10:
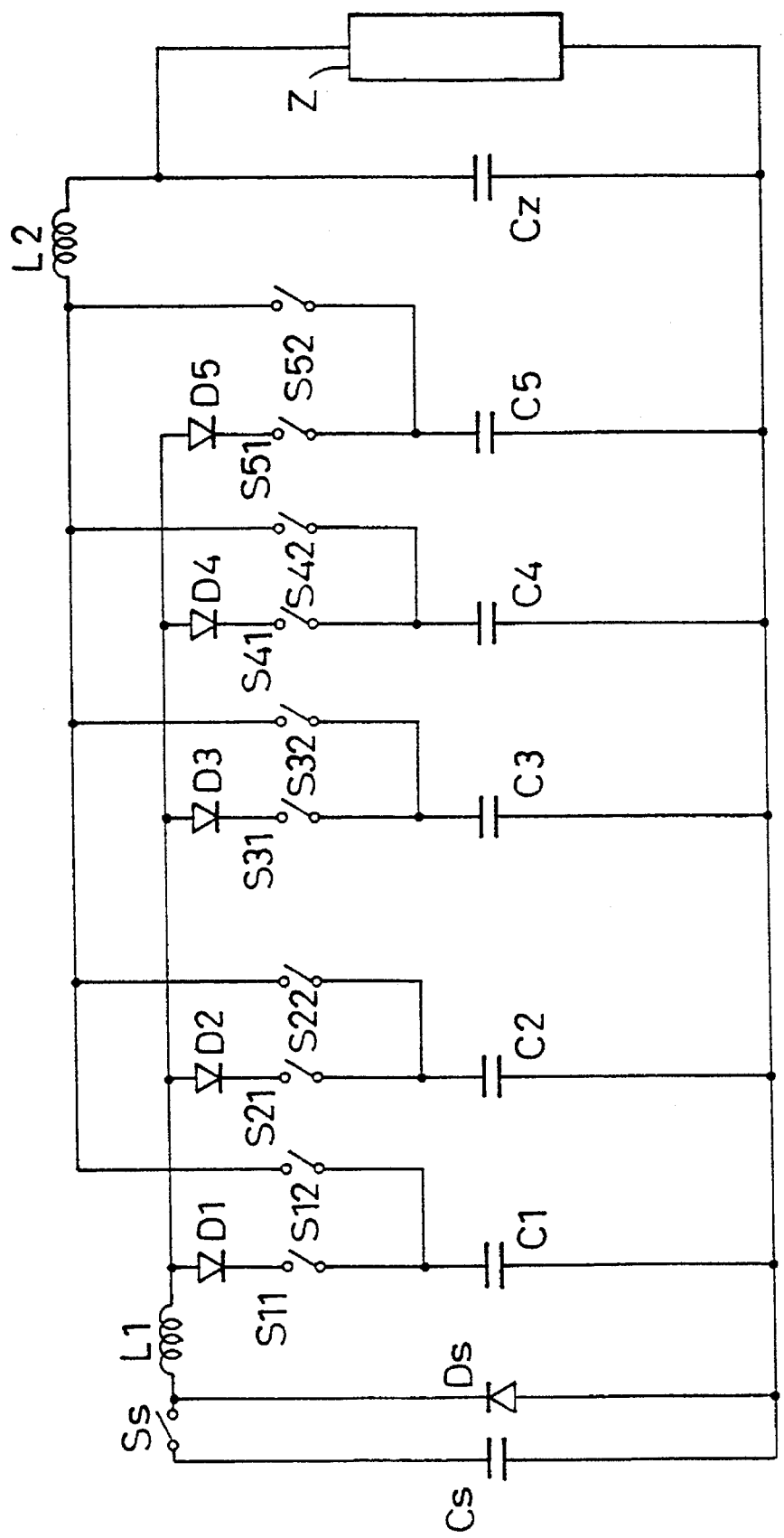
FIG. 10 is a circuit diagram of Embodiment 8 according to the present invention.

Referring to the operation of Embodiment 7 more concretely with reference also to FIG. 9, the capacitor C1 is first charged by turning ON the switching element S11 as in FIG. 9(b) in a state where the switching element Ss is made ON at time t1 as in FIG. 9(a). At time t2 immediately before turning OFF the switching element S11 at time t3, the switching element S21 is made ON to charge the capacitor C2. Next, at time t4 immediately before turning OFF the switching element S21 at time t5, the switching element S31 is made ON as in FIG. 9(d), and the switching element Sa2 is simultaneously turned ON as in FIG. 9(h). So long as the capacitor Ca has been already charged here, the source voltage E of the power source DC is added to the terminal voltage Va0 of the capacitor Ca, and a total voltage of this addition is caused to be applied to the capacitor C3. That is, it is possible to render the terminal voltage Vc3 of the capacitor C3 to be higher than the source voltage E. Thereafter, similarly with the switching element Sa2 kept in its ON state, the switching elements S41 and S51 are sequentially turned ON, and the capacitors C4 and C5 are charged until their terminal voltages Vc4 and Vc5 become higher than the source voltage E. Thus, by partly overlapping the ON periods of the respective switching elements S11–S51, there is caused no pausing period to occur in the current flowing to the inductor L1.

Further, at time t10 immediately before the set value V50 is substantially reached by the terminal voltage Vc5 of the capacitor C5, the switching element Sa3 is made ON as in FIG. 9(i), and the charging from the capacitor Ca to the capacitor C5 is interrupted. An energy accumulated in the inductor L1 is discharged at this time, and the charging to the capacitor C5 is continued. Next, the switching element Sa2 is turned OFF at time t11 as in FIG. 9(h) and, further, the switching element Sa1 is made ON at time t12 as in FIG. 9(g), then the capacitor Ca is charged by the power source DC. Thereafter, the switching element S51 is turned OFF at time t13, and the charging of the capacitor C5 is completed.

Next, as the switching element Ss is turned OFF at time t14 as in FIG. 9(a), the accumulated energy in the inductor L1 is discharged through a path of the inductor L1, diode Da1, switching element Sa1, capacitor Ca, switching element Sa3, diode Da2 and diode Ds, and the capacitor Ca is charged with this energy. When the accumulated energy in the inductor L1 is exhausted in this way, the switching elements Sa1 and Sa3 are turned OFF.

By controlling the operation of the respective switching elements S11–S51 and Sa1–Sa3 as set forth in the above, the target terminal voltages V10–V50 respectively set for each of the capacitors C1–C5 and Ca can be obtained, as shown in FIG. 9(j). Thus, as has been referred to in respect of Embodiment 1 and so on, it is possible to vary the terminal voltage Vz of the capacitor Cz with time, by controlling the switching elements S12–S52 and connecting the respective capacitors C1–C5 through the inductor L2 to the load-use capacitor Cz. Other constituents and operation are the same as those in Embodiment 1. While in the present embodiment the capacitor Ca is disposed between the two capacitors C2 and C3 for charging the capacitors C3–C5 to the voltage higher than the source voltage E, it is also possible to charge, for example, the capacitor C5 only to a voltage higher than the source voltage E by inserting the capacitor Ca between the capacitors C4 and C5, that is, at a proper portion between the capacitors C1–C5 depending on the objective one of the capacitors.

EMBODIMENT 8

The present Embodiment 8 is featured in that, in the circuit arrangement of Embodiment 1, a capacitor Cs is employed in place of the DC power source DC. This capacitor Cs is re-charged at every cycle of the voltage variation of the load-use capacitor Cz. Further, while the respective capacitors C1–C5 constituting the switched capacitors are charged sequentially from the one the terminal voltage Vc1/Vc5 of which is set lower to the one the terminal voltage of which is set higher, the present Embodiment 8 is provided for charging the capacitors sequentially from the one having the higher terminal voltage Vc to the one having the lower terminal voltage. Here, the terminal voltage Vcs of the capacitor Cs before starting the charging of the capacitors C1–C5 is set to be higher than the set value V50 for the terminal voltage Vc5 of the capacitor C5 which is set to be the largest among the terminal voltages Vc1–Vc5.

In the case of Embodiment 1, the charging of all of the capacitors C1–C5 forming the switched capacitors has been made with the source voltage E, and the differences Ve1–Ve5 between the respective terminal voltages Vc1–Vc5 of the capacitors C1–C5 and the source voltage E has been larger as the terminal voltage Vc is set lower (Ve1>Ve2>Ve3>Ve4>Ve5). Consequently, the loss upon the charging has been much more in response to the largeness of the voltage difference Ve1–Ve5. In contrast, according to the present Embodiment 8, the capacitors C1–C5 are respectively charged by the capacitor Cs while the capacitor C5 the terminal voltage Vcs of which is set to be higher than the terminal voltages Vc4–Vc1 is charged at first and is made to charge sequentially the capacitors C4–C1 the terminal voltages Vc1–Vc5 of which are set to be lower, and the terminal voltage Vcs of the capacitor Cs is lowered as the charging of the capacitors C1–C5 advances as shown in FIG. 11(b), whereby the variation in the difference Ve1–Ve5 of the terminal voltages Vcs and Vc1–Vc5 of the respective capacitors Cs and C1–C5 at the starting point of the charging to the capacitors C1–C5 is reduced. That is, the peak value of the charging current can be restrained and the circuit efficiency can be improved. Other constituents and operation are the same as those in Embodiment 1.

EMBODIMENT 9

Figure 12:
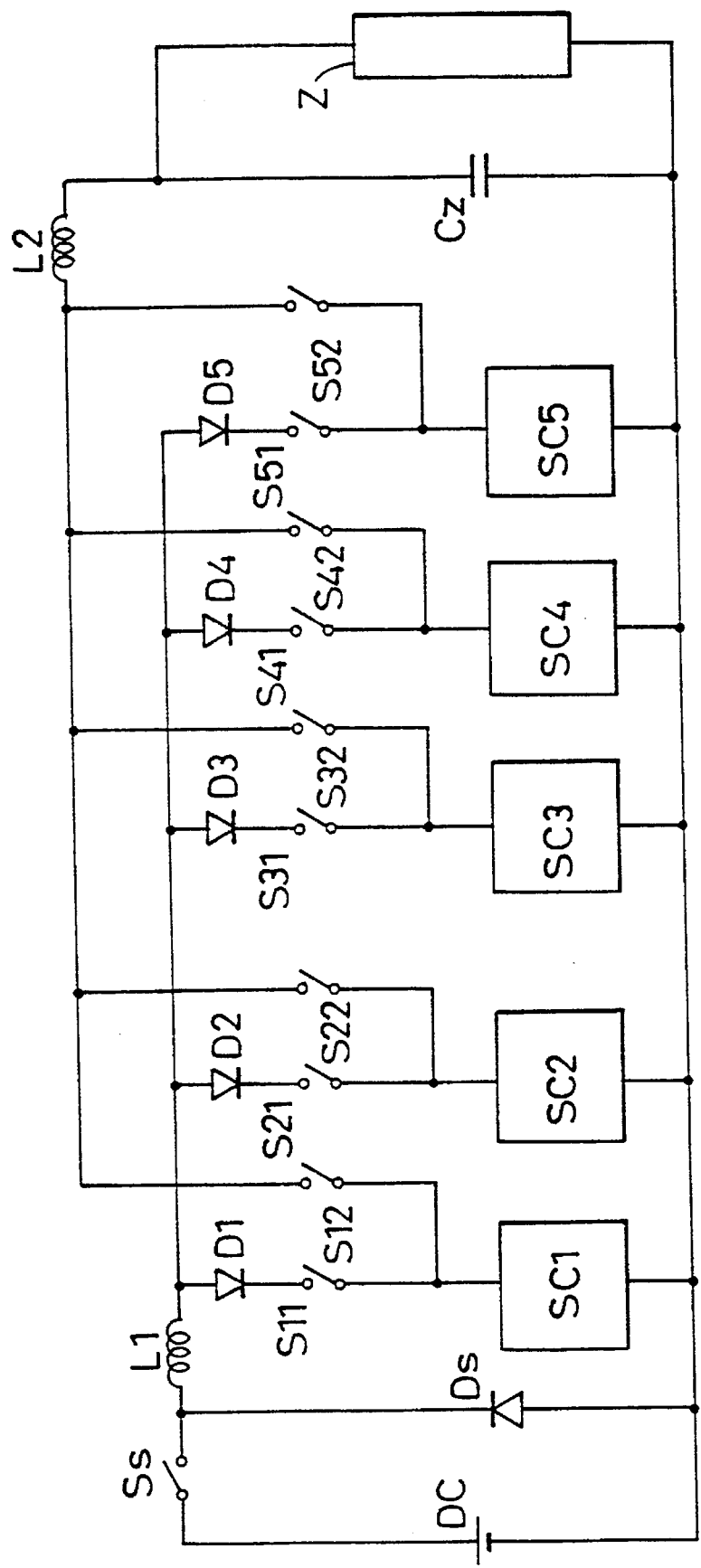
FIG. 12 is a circuit diagram showing Embodiment 9 according to the present invention.
Figure 13:
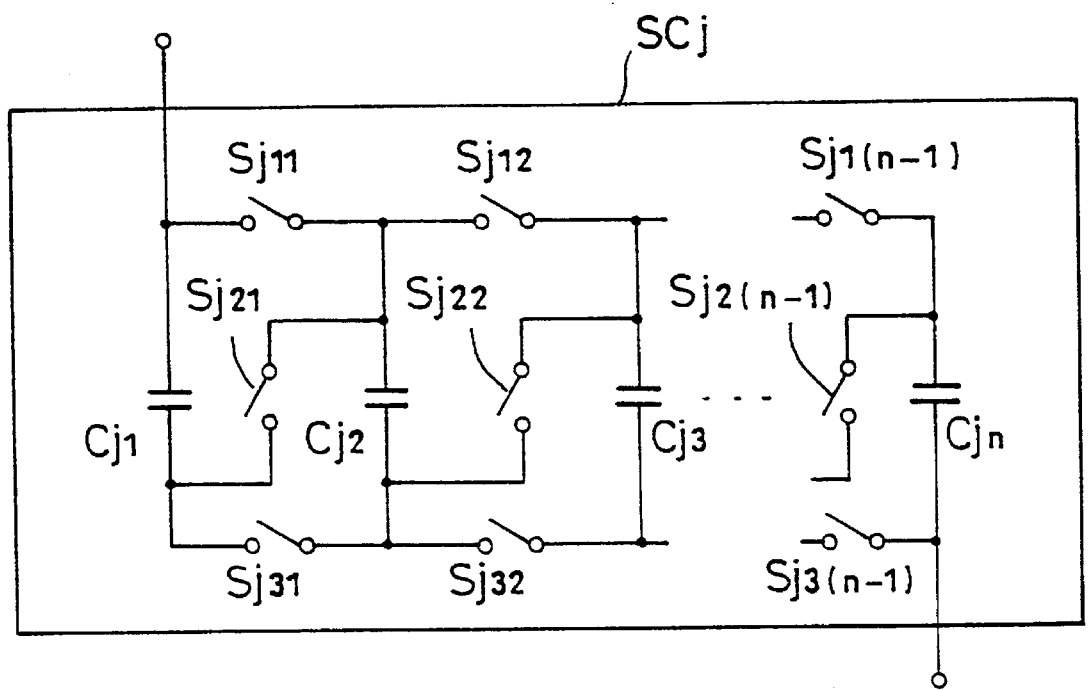
FIG. 13 is a fragmentary circuit diagram showing a switched capacitor section in Embodiment 9 of FIG. 12.

As shown in FIG. 12, this Embodiment 9 comprises switched capacitors SCj of such structure as in FIG. 13, in place of the capacitors C1–C5. The switched capacitors SCj respectively comprise a plurality of capacitors Cjn (j=1, 2, . . . 5 and n=1, 2, . . .), switching elements Sj1(n−1) respectively inserted between one ends of respective pairs or adjacent ones of the capacitors Cj(n−1) and Cj(n), switching elements Sj3(n−1) respectively inserted between the other ends of the respective pairs of these capacitors Cj(n−1) and Cjn, and switching elements Sj2(n−1) respectively inserted between the one end of the capacitor Cjn and the other end of the capacitor Cj(n−1). Thus the switched capacitor SCj is arranged for rendering the terminal voltage thereof to be different between the charging state and the discharging state.

That is, in the case where the terminal voltages of the respective switched capacitors SCj are set to be lower than the source voltage E of the power source DC, the capacitors Cjn are connected in series by turning ON the switched elements Sj2(n−1) while turning OFF the switching elements Sj1(n−1) and Sj3(n−1) but, in the event of the discharge, the capacitors Cjn may be connected just in parallel with each other by turning OFF the switching elements Sj2(n−1) and turning ON the switching elements Sj1(n−1) and Sj3(n−1). In this case, the arrangement is so made that the terminal voltage upon the discharging of the switched capacitor SCj will be Vj0/n when the terminal voltage upon the charging is Vj0.

In the case where the terminal voltages of the respective switched capacitors SCj are set to be higher than the source voltage E of the power source DC, on the other hand, the capacitors Cjn are connected in series by turning OFF the switching elements Sj2(n−1) while turning ON the switching elements Sj1(n−1) and Sj3(n−1) but, in the event of the discharging, the capacitors Cjn may just be connected in series by turning ON the switching elements Sj2(n−1) and turning OFF the switching elements Sj1(n−1) and Sj3(n−1). In this case, the arrangement is so made that the terminal voltage upon the discharging of the switched capacitors SCj will be n Vj0 when the terminal voltage upon the charging is Vj0.

With such proper control as in the above of the respective switched capacitors SCj, it is made possible to set the terminal voltage of these switched capacitors in a wide range, and to set variously the applied voltage to the load Z in response to the object even with the single DC power source DC employed. Other constituents and operation are the same as those in Embodiment 1.

EMBODIMENT 10

Figure 14:
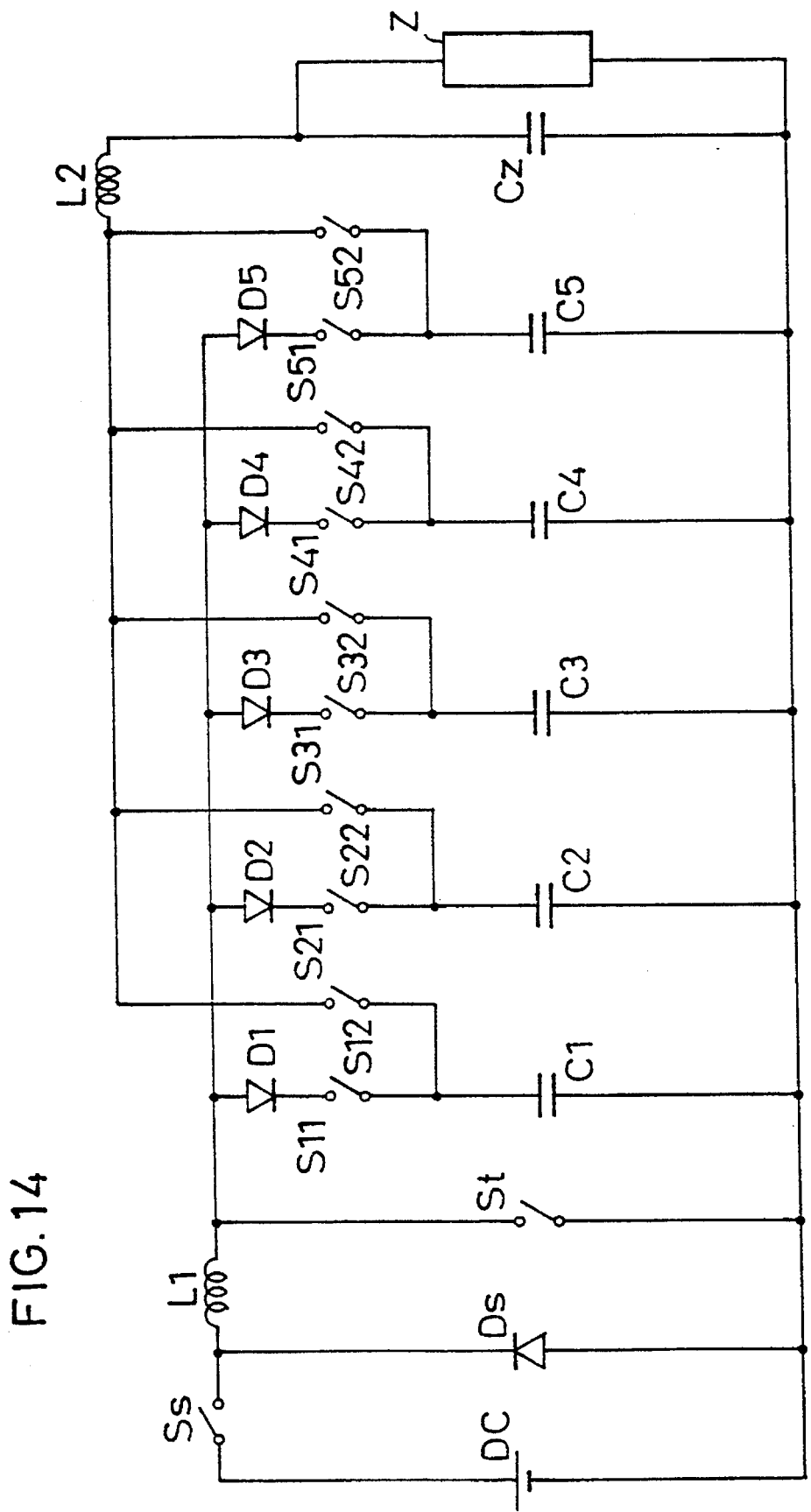
FIG. 14 is a circuit diagram showing Embodiment 10 according to the present invention.
Figure 15:
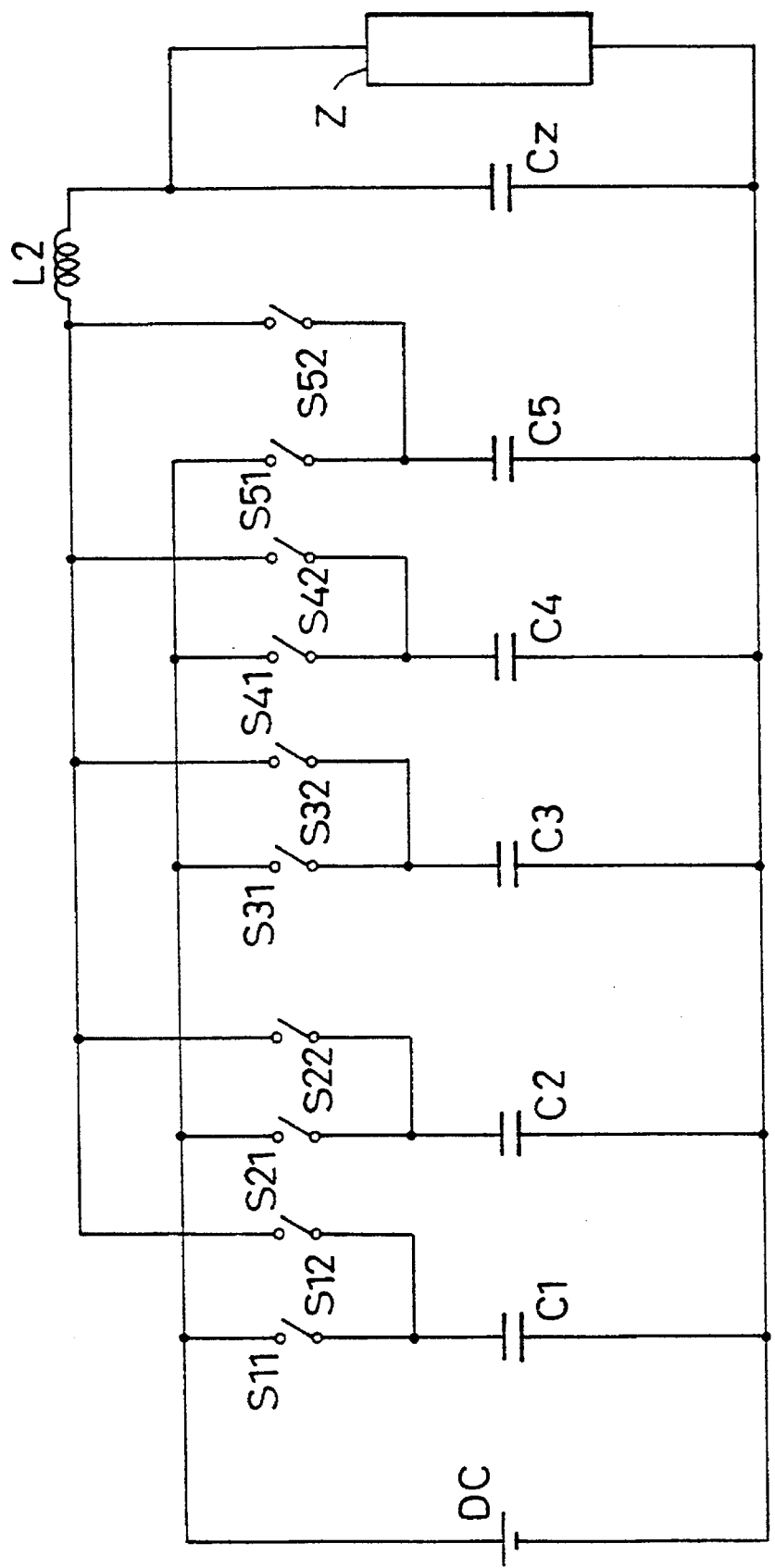
FIG. 15 is a circuit diagram of Embodiment 11 according to the present invention.

As shown in FIG. 14, this Embodiment 10 has an arrangement in which a switching element St is added to the circuit of Embodiment 1 as connected in parallel to the series circuit of the inductor L1 and diode Ds. With this circuit arrangement, it is possible to have part of the arrangement caused to function as a voltage dropping chopper circuit including the switching element Ss, inductor L1, diode Ds and capacitors C1–C5, with the switching element St kept in OFF state and with the switching element Ss switched over at a proper frequency, and it is also enabled to have another part of the arrangement actuated to function as a voltage boosting chopper circuit including the switching element St, inductor L1, diodes D1–D5 and capacitors C1–C5, with the switching element Ss kept in ON state and with the switching element St switched over at a proper frequency.

According to the foregoing arrangement, therefore, the function of the voltage dropping chopper circuit is performed to drop the charging voltage to the capacitors C1–C5 to be below the source voltage E in the event when the set values of the terminal voltages Vc1–Vc5 upon the charging of the respective capacitors C1–C5 are lower than the source voltage E of the source DC, or the function of the voltage boosting chopper circuit is performed to raise the charging voltage to the capacitors C1–C5 above the source voltage E in the event when the set values of the terminal voltages Vc1–Vc5 are higher than the source voltage E. In this manner, the arrangement is utilized as the voltage dropping or boosting chopper circuit for charging the capacitors C1–C5, the applied voltage to the load Z is thereby enabled to be set in a wide range, likewise Embodiment 9, and any power loss upon the charging is also enabled to be reduced by concurrently employing the switching power source. Other constituents and operation are the same as those in Embodiment 1.

The present Embodiment 11 takes up an arrangement in which the switching elements Ss, diodes Ds and D1–D5 and inductor L1 in the circuit of Embodiment 1 are omitted. That is, the arrangement is so made that, in charging the respective capacitors C1–C5, they are charged without interposition of the inductor L1, and the charging can be attained to have the desired set values reached by the terminal voltages Vc1–Vc5 of the capacitors C1–C5 only through the control of ON period of the respective switching elements S11–S51. Other constituents and operation are the same as those in Embodiment 1, but the omission of the inductor L1 therefrom easily renders the entire arrangement to be more minimizable in size and weight.

EMBODIMENT 12

Figure 16:
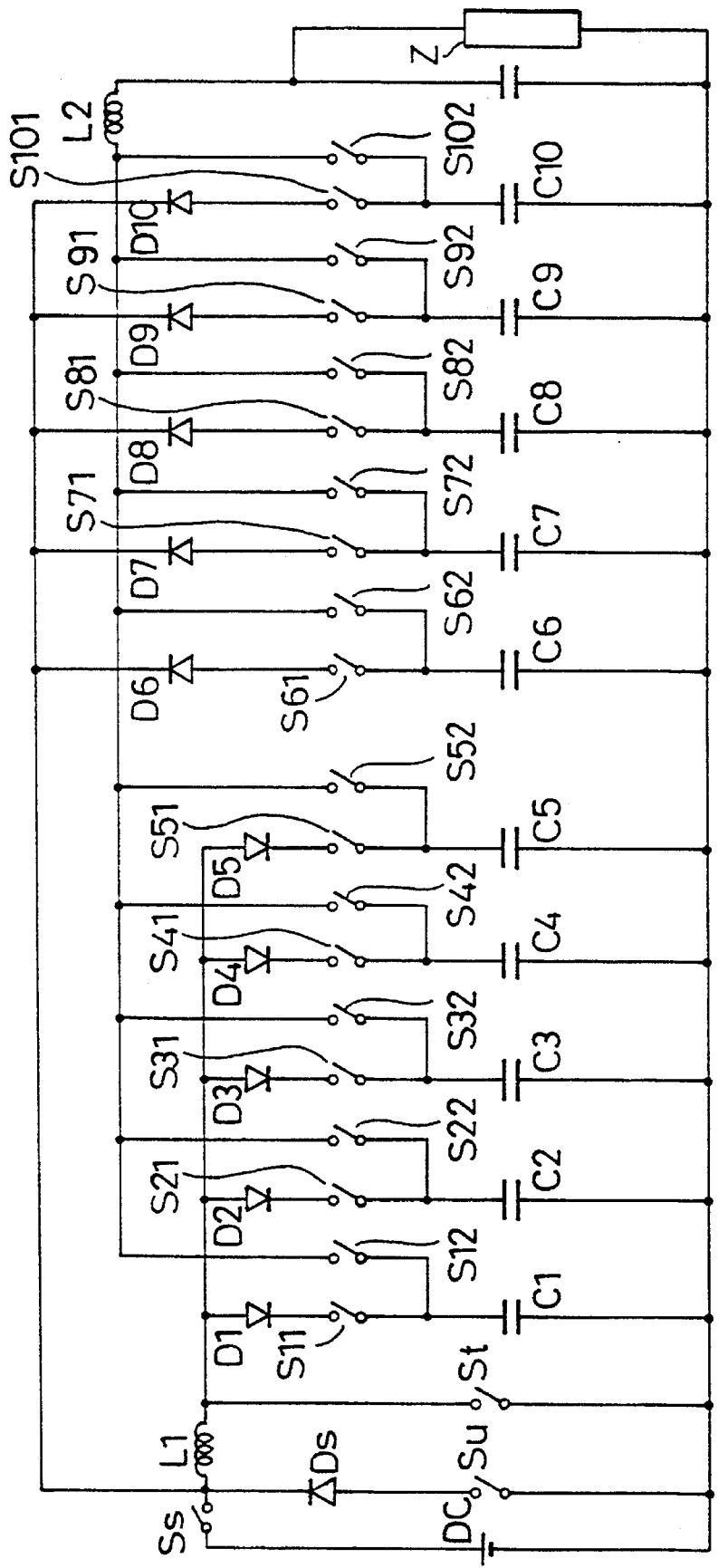
FIG. 16 is a circuit diagram showing Embodiment 12 according to the present invention.

This Embodiment 12 is constituted for applying an AC voltage to the load Z only by means of the switched capacitors, without using any inverter circuit, but, as shown in FIG. 16, means is added to the arrangement of Embodiment 10 for supplying current to the load Z in a direction inverse to that for the capacitors C1–C5. To the diode Ds, a switching element Su is connected in series. As the means for supplying to the load Z the inverse directional current with respect to the capacitors C1–C5, there is employed a plurality of capacitors C6–C10 corresponding in number to the capacitors C1–C5. That is, there are provided two groups of the capacitors, which groups respectively comprising the plurality of capacitors C1–C5 or C6–C10. To the respective capacitors C6–C10, each of diodes D6–D10 and each of switching elements S61–S101 are connected in series, and further switching elements S62–S102 are connected respectively to each of the capacitors C6–C10, separately from the diodes D6–D10 and switching elements S61–S101. Respective series circuits of respective ones of the capacitors C6–C10, diodes D6–D10 and switching elements S61–S101 are mutually connected in parallel, and such parallel circuits are connected in parallel to the series circuit of the source DC and switching elements Ss. Further, the series circuits of the respective capacitors C6–C10 and switching elements S62–S102 are connected mutually in parallel, and these parallel circuits are respectively connected in parallel to the series circuit of the inductor L2 and load-use capacitor Cz.

The operation for charging the capacitors C1–C5 from the power source DC is the same as the foregoing Embodiment 10, such that the arrangement is made to function as the voltage dropping chopper circuit by keeping the switching elements St and Su respectively in OFF state and in ON state while switching over the switching element Ss at a proper frequency, so as to be able to charge the capacitor Cj with a voltage lower than the source voltage E of the source DC, or the arrangement is made to function as the voltage boosting chopper circuit by keeping the switching elements Ss and Su in ON state while switching over the switching element St at a proper freuqency, so as to be able to charge the capacitors C1–C5 with the voltage higher than the source voltage E.

In charging the further group of capacitors C6–C10 from the DC power source DC, on the other hand, the switching element St is kept ON, and the switching element Ss is switched over at a proper frequency. With this operation, a function of an inversion chopper circuit (or voltage boosting and dropping chopper circuit, in other words) is attained by means of the switching element Ss, inductor L1, capacitors C6–C10 and diodes D6–D10, whereby the capacitors C6–C10 can be charged with the accumulated energy in the inductor L1 when the switching element Ss is in OFF state. By properly setting the switching frequency of the switching element Ss, further, it becomes possible to charge the capacitors C1–C5 with a voltage lower or contrarily higher than the source voltage E.

With such arrangement as in the foregoing, it is made possible to supply to the load Z from the capacitors C1–C5 a current flowing through the load Z in downward direction in FIG. 16, and from the capacitors C6–C10 a current flowing through the load Z in upward direction in FIG. 16. That is, it is made possible to alternate the direction of supplied current to the load Z and, since the current is caused to resonantly flow to the load Z by means of the inductor L2 and load-use capacitor Cz, it is enabled to apply to the load Z an AC voltage of a smooth voltage variation. Other constituents and operation are the same as those in Embodiment 1.

EMBODIMENT 13

Figure 17:
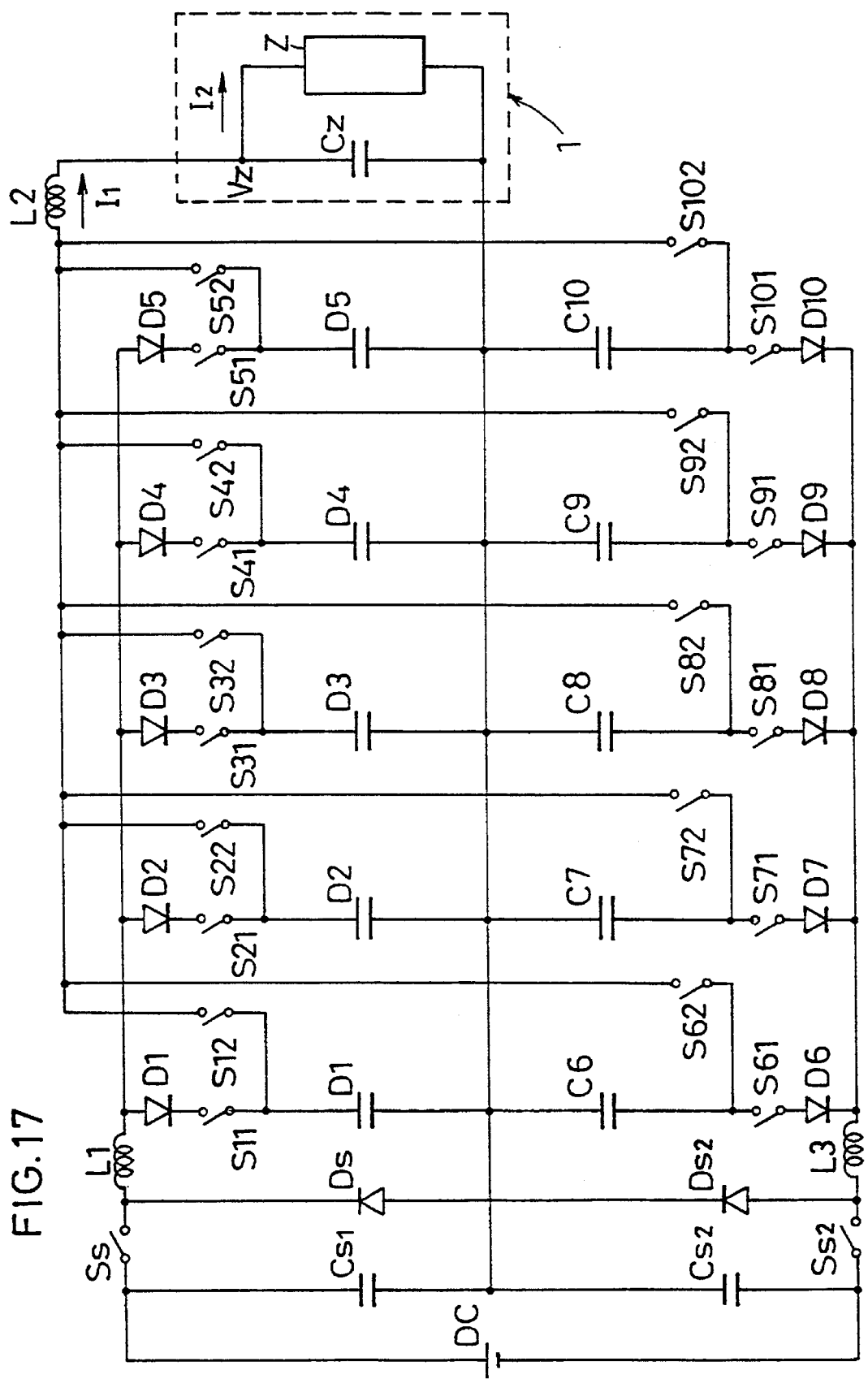
FIG. 17 shows a circuit diagram of Embodiment 13 according to the present invention.

This Embodiment 13 is arranged for applying also the AC voltage to the load Z only by means of the switched capacitors, similarly to Embodiment 12, such that, as shown in FIG. 17, series circuits respectively of a pair of the capacitors are connected in parallel to the DC power source DC, the source voltage E of which source is thereby divided, and two sets of the switched capacitors are charged with the respective capacitors made as the power source. That is, while the switched capacitors have the same arrangement as in Embodiment 12, the diodes D6–D10 are connected on their cathode side through an inductor L3 and switching element Ss2 to a negative pole of the DC power source DC, in place of the arrangement for charging the capacitors C6–C10 through the inversion chopper circuit. Further, the two groups of capacitors C1–C5 and C6–C10 are connected in common at their one ends and at these one ends to a junction point between two capacitors Cs1 and Cs2 for dividing the source voltage E.

With the above arrangement, the two groups of the capacitors C1–C5 and C6–C10 are to be charged from the capacitors Cs1 and Cs2 for dividing the source voltage E of the power source DC, the connection of the commonly connected one ends of the two groups of the capacitors C1–C5 and C6–C10 to the junction point of the source-voltage dividing capacitors Cs1 and Cs2 eventually causes inverse directional currents to flow to the load Z upon discharging of the two groups of the capacitors C1–C5 and C6–C10, so that, similar to Embodiment 12, the AC voltage smoothly varying can be applied to the load Z. Other constituents and operation are the same as those in Embodiment 1.

In the foregoing respective Embodiments, the number of the capacitors C1–C5 and C6–C10 constituting the switched capacitors is not required to be particularly limited but may be decreased or increased from that has been described, as occasion demands. In that event, the larger the number of the capacitors C1–C5 and C6–C10, the smoother the voltage variation attainable, and the difference in the terminal voltage between the adjacent ones of the capacitors (for example, C4 and C5 or C9 and C10) is made smaller, so that the inductor L2 can be the one small in the withstand voltage. With the use of such power converting circuit arrangement as has been described, the higher harmonics radiated from the lamp is reduced even in the event where the load Z is a discharge lamp, any stress to the lamp is reduced by the applied voltage to the lamp as made into the sinusoidal waveform, and the life of the lamp can be eventually prolonged.

EMBODIMENT 14

Figure 18:
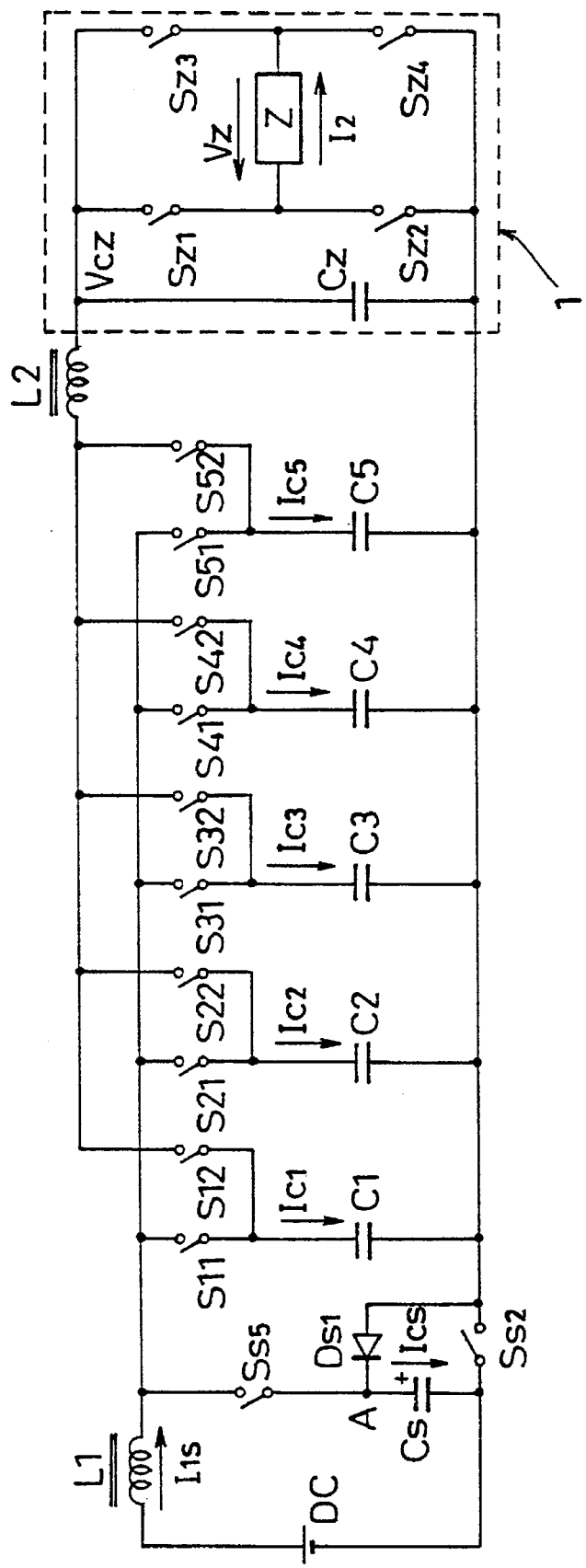
FIG. 18 is a circuit diagram of Embodiment 14 according to the present invention.

In Embodiment 14 shown in FIG. 18, in contrast to the foregoing Embodiment 6 of FIG. 7, the switching element Ss and diode Ds are replaced by an arrangement of a switching element Ss2 connected in series between the ground side ends of the capacitors C1–C5 and the negative pole terminal of the DC power source DC, a series circuit of a switching elements Ss5 and capacitor Cs and connected in parallel to the both terminals of the source DC, and a diode Ds1 inversely connected in parallel across a series circuit of the capacitor Cs and switching element Ss2, so that the capacitor Cs which is charged during the charging of the capacitors C1–C5 will be inserted in series in a resonance circuit comprising the inductor L1 and capacitor Cn to have its resonance current abruptly reduced to be zero and the switching element Ss2 will be turned OFF at the zero-cross point. The voltage Vc1–Vc5 of the capacitors C1–C5 are made to be lower than or substantially equal to the voltage of the source DC.

The operation of Embodiment 14 shall be briefly described with reference also to FIG. 19.

Now, it should be assumed that a junction point A between the capacitor Cs and the diode Ds1 is at positive potential before time t0 is reached so that the both end voltage Vcs of the capacitor Cs will be charged up to an initial voltage value. As the switching elements S51 and Ss2 are turned ON at time t0, the capacitor C5 is charged from the source DC through the inductor L1. At this time, the source current I11 flows resonantly at a time constant of the inductor L1 and capacitor C5. As the switching element Ss2 is turned OFF at time t1 at which the both-end voltage Vc5 of the capacitor C5 substantially reaches the set voltage, then a series circuit of the capacitors C5 and Cs is charged from the source DC. When at this time the both-end voltage Vcs of the capacitor Cs is so set that the current I1s will flow from the source DC with a resonance of the series circuit capacity of the capacitor C5 and Cs and the time constant of the inductor L1 and the both end voltage Vcs of the capacitor Cs is so set that the source voltage E<Vc5+Vcs, then the current I1 is caused to be abruptly reduced to become zero at time t2. At this time t2, the switching element S51 is turned OFF. As the switching element S41 and Ss2 is made ON at time t3, the capacitor C4 is charged from the source DC through the inductor L1, upon which the current I1s flows resonantly with the time constant of the inductor L1 and capacitor C4. As the both end voltage Vc4 of the capacitor C4 substantially reaches the set voltage at time t4, the switching element Ss2 is turned OFF and the capacitor Cs is inserted in the path of the current I1s, similarly to the state at time t1 while the both end voltage Vcs of the capacitor Cs is so set as to be E<Vc4+Vcs, then the current I1s abruptly reduces to become zero at time t5. At time t5, next, the switching element S4 is turned OFF. At the remaining capacitors C1–C3, the same operation as that of the capacitors 4 and 5 is performed.

Here, the both end voltage Vcs of the capacitor Cs becomes higher than the initial value at time t0 when time t14 at which the charging of the capacitor C1 is completed is reached, whereby the switching element Ss5 is made ON at time t15 to have a power returned to the source DC through the inductor L1, and the capacitor Cs is thereby reset.

With the foregoing arrangement employed, it is enabled to charge the capacitors C1–C5 to the set voltages at a high speed and at a high efficiency.

EMBODIMENT 15

Figure 20:
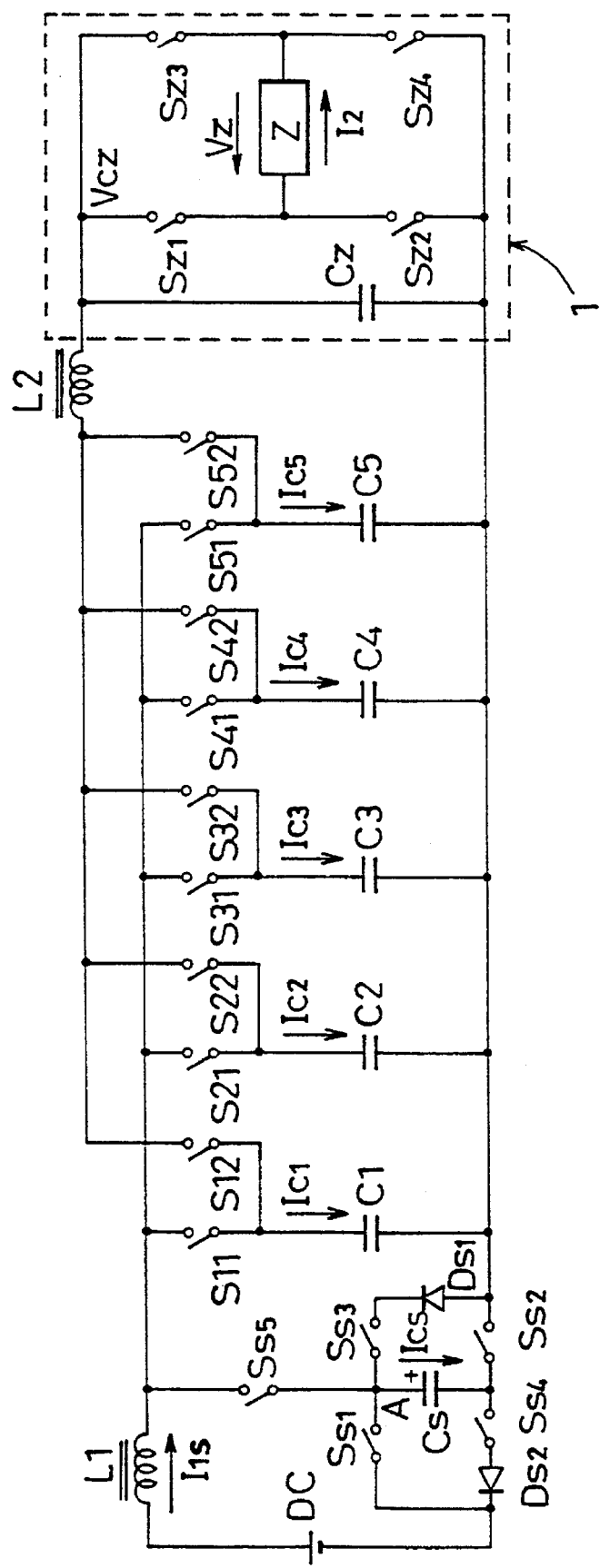
FIG. 20 is a circuit diagram of Embodiment 15 according to the present invention.
Figure 21:
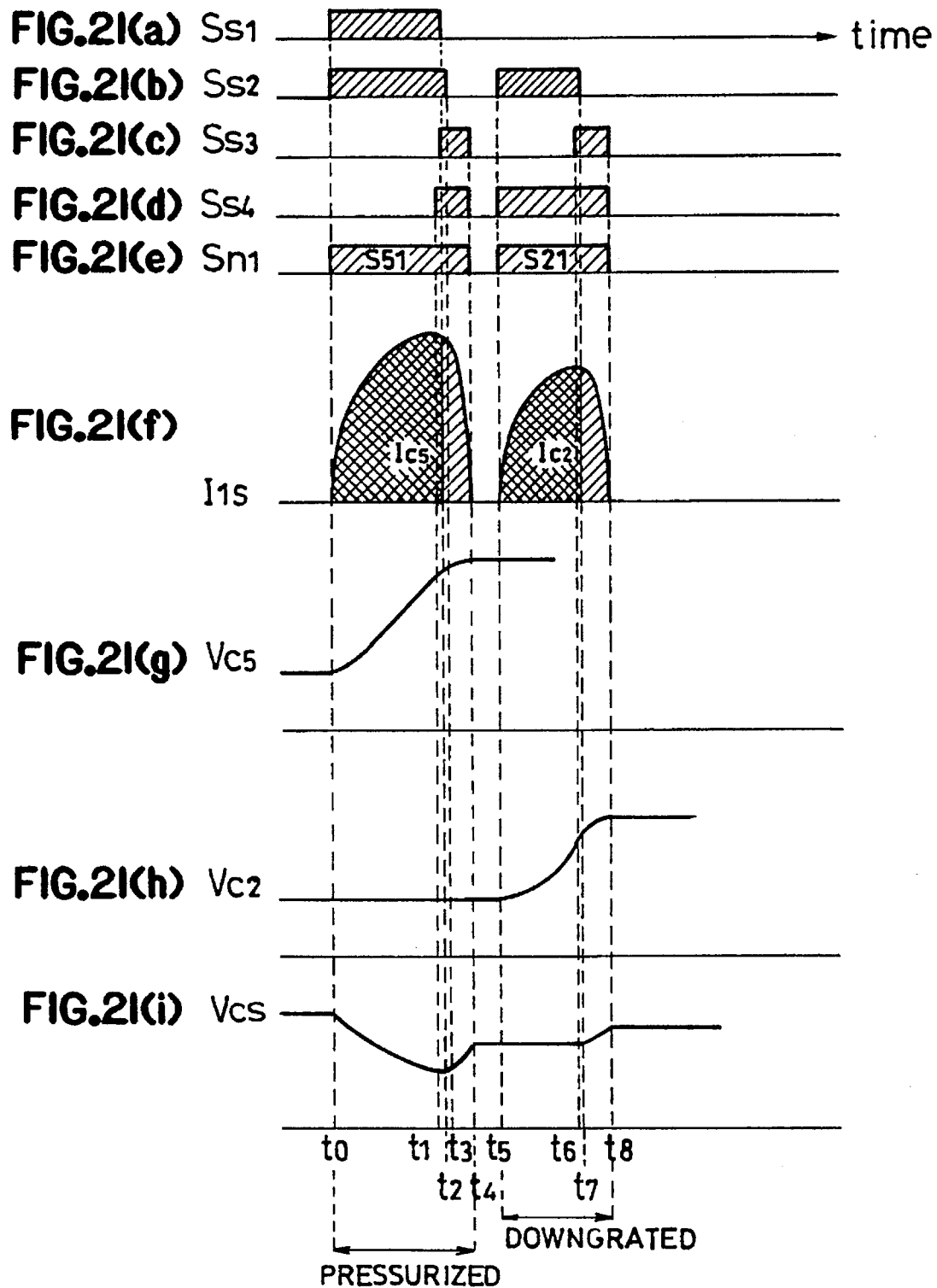
FIGS. 21(a) to 21(i) are operational waveform diagrams of Embodiment 15 of FIG. 20.

In FIG. 20, there is shown a circuit diagram of Embodiment 15, and its operation is shown in FIG. 21.

Figure 19:
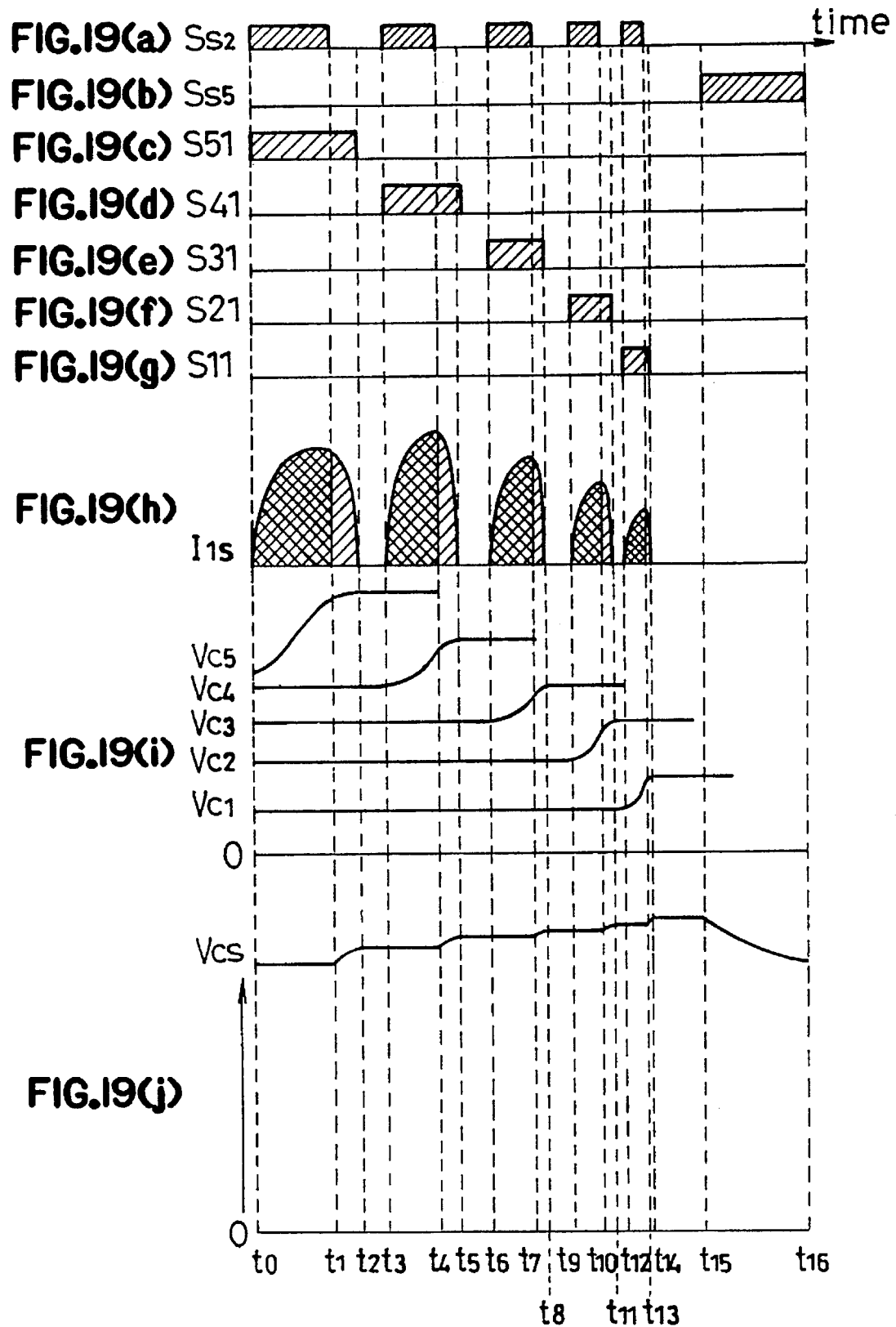
FIGS. 19(a) to 19(j) are operational waveform diagrams for Embodiment 14 of FIG. 18.

In contrast to Embodiment 14 shown in FIGS. 18 and 19, a series circuit of a switching element Ss4 and a diode Ds2 for prevention of inverse directional current from flowing through the capacitor Cs is additionally inserted between one end of the capacitor Cs and the ground side terminal of the DC power source DC, a switching element Ss3 is connected between the inverse current preventing diode Ds1 for the capacitor Cs and the junction point A, a switching element Ss1 is connected between the junction point A and the diode Ds2, and the capacitor Cs is inserted in the current flow path as made to be of inverse polarity, whereby the arrangement enables it possible to charge the capacitors C1–C5 to the voltages higher than the source voltage, while employing the capacitor Cs also as a capacitor for abruptly reducing the resonance current. Other constituents identical to those in Embodiment 14 are shown with identical reference numbers.

Further, the operation of the present Embodiment 15 shall be briefly explained with reference also to FIG. 21. In the present Embodiment 15, the operation is made different between the high voltage charging and the normal charging of the capacitor Cs, and such different operation shall be explained respectively.

First, the explanation is made with reference to a case when, for example, the capacitor C5 is charged to a high voltage. Assuming here that the both end voltage Vcs of the capacitor Cs has been charged to an initial voltage with the junction point A made to be at positive potential up to time t0, then the turning ON at time t0 of the switching elements Ss1, Ss2 and S51 causes the capacitor C5 to be charged to a high voltage with a voltage E+Vcs through a path of the DC power source DC→inductor L1→capacitor C5→switching element Ss2→capacitor Cs→switching element Ss1→the DC power source DC. At time t1 at which the capacitor C5 is charged to be substantially the set voltage, the switching element Ss4 is turned ON and, at time t2, the switching element Ss3 is made ON while the switching element Ss1 is turned OFF. Next, at time t3, the switching element Ss2 is turned OFF, and the capacitor Cs is inserted in the current path so as to be of the inverse polarity in a period from time t0 to time t1, whereby the current I1s is reduced abruptly as shown in FIG. 21(f), the switching element S51 is turned OFF at time t4 at which the current I1 becomes zero, and the capacitor C5 is separated from the charging path. As shown in FIG. 21(g), the both end voltage Vcs of the capacitor Cs decreases during the charging of the capacitor C5 (time t0 to t1) but the both end voltage Vcs of the capacitor Cs is raised by the charge from the source DC in a period from t3 to t4 so as to act to complement a voltage drop component upon the discharging.

Next, the case of the ordinary charging of the capacitor C2, for example, shall be explained.

The capacitor C2 is directly charged from the DC power source DC, and the capacitor Cs is connected in series to the capacitor C2 as the voltage of this capacitor C2 becomes closer to the set voltage, to abruptly decrease the current I1s. In practice, the switching elements Ss2, Ss4 and S21 are turned ON at time t4, and the capacitor C2 is charged through a path of the source DC→inductor L1→capacitor C2→switching element Ss2→switching element Ss4→diode Ds2→the source DC. When the current I1s is to be abruptly reduced, the switching element Ss3 is made ON and the switching element Ss2 is turned OFF, so that the capacitor Cs is connected in series with the capacitor C2.

With the above arrangement, the capacitors C1–C5 can be charged to the high voltages so that, when such load Z as the discharge lamp requires that the load voltage is raised at the time of dimming or the like, a stable lighting can be attained with the voltages of the capacitors C1–C5 raised.

Since the both end voltage Vcs of the capacitor Cs raises upon the abrupt decrease of the current I1s while the voltage of the capacitor Cs is lowered upon the charge of the capacitors C1–C5 to the high voltage, the charging and discharging amount between the source DC and the capacitor Cs at the time of resetting the both end voltage Vcs of the capacitor Cs upon termination of the operation for one cycle is made less.

EMBODIMENT 16

Figure 22:
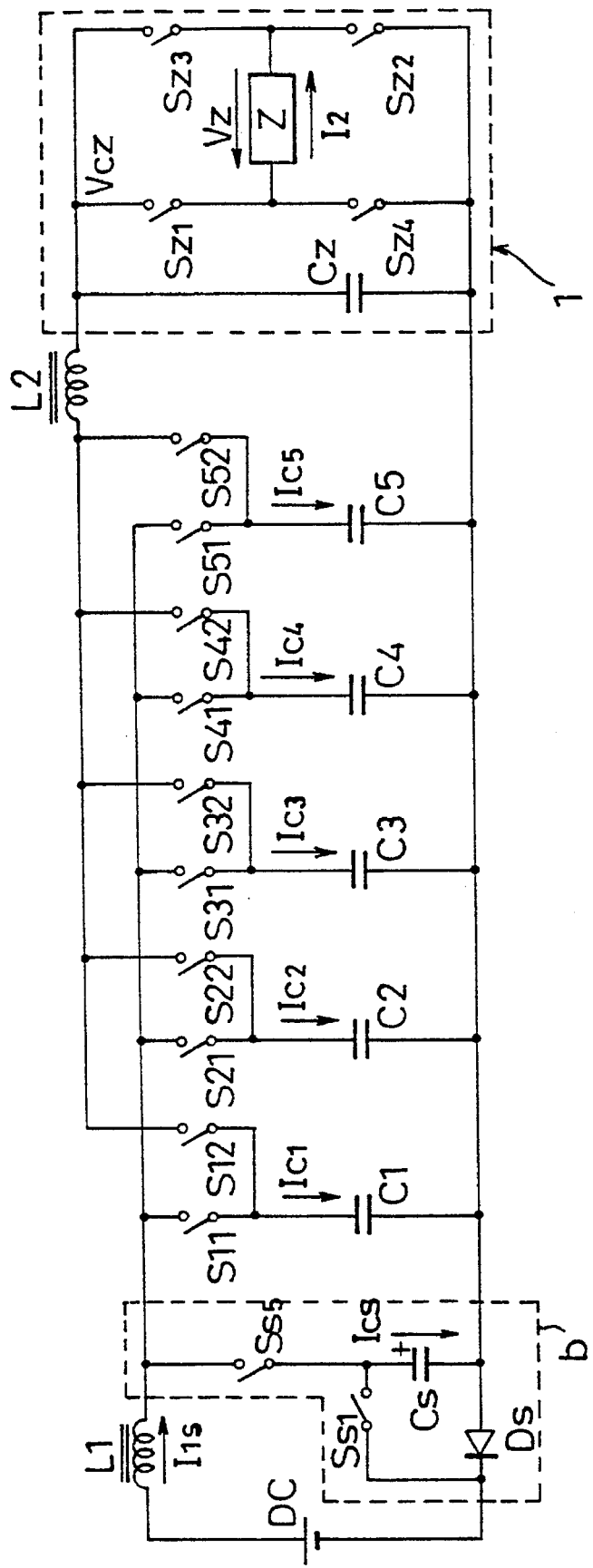
FIG. 22 is a circuit diagram of Embodiment 16 according to the present invention.

In FIG. 22, a circuit of Embodiment 16 is shown. The distinction of the present Embodiment 16 for the foregoing Embodiment 15 of FIG. 20 resides in that the switching elements Ss2 and Ss3 and the inverse current preventing diode Ds1 for the capacitor Cs are omitted to form a current control section b and the arrangement is so made that the capacitor Cs is removed from the current path in order to have the current I1s flowing through the inductor L1 abruptly reduced, and all other constituents indentical to those used in Embodiment 15 are denoted by identical reference numbers so as to omit their description.

Next, the operation of this Embodiment shall be explained briefly.

In charging the capacitors C1–C5 to the high voltages, the capacitor Cs is connected in series to the DC power source DC by turning ON the switching element Ss1. As the capacitors C1–C5 are charged substantially to the set voltages, the switching element Ss1 is turned OFF, so that the capacitor Cs will be removed from the current path to render the source voltage to be lower than the voltages of the capacitors C1–C5, and the current I1 can be thereby reduced abruptly.

EMBODIMENT 17

Figure 23:
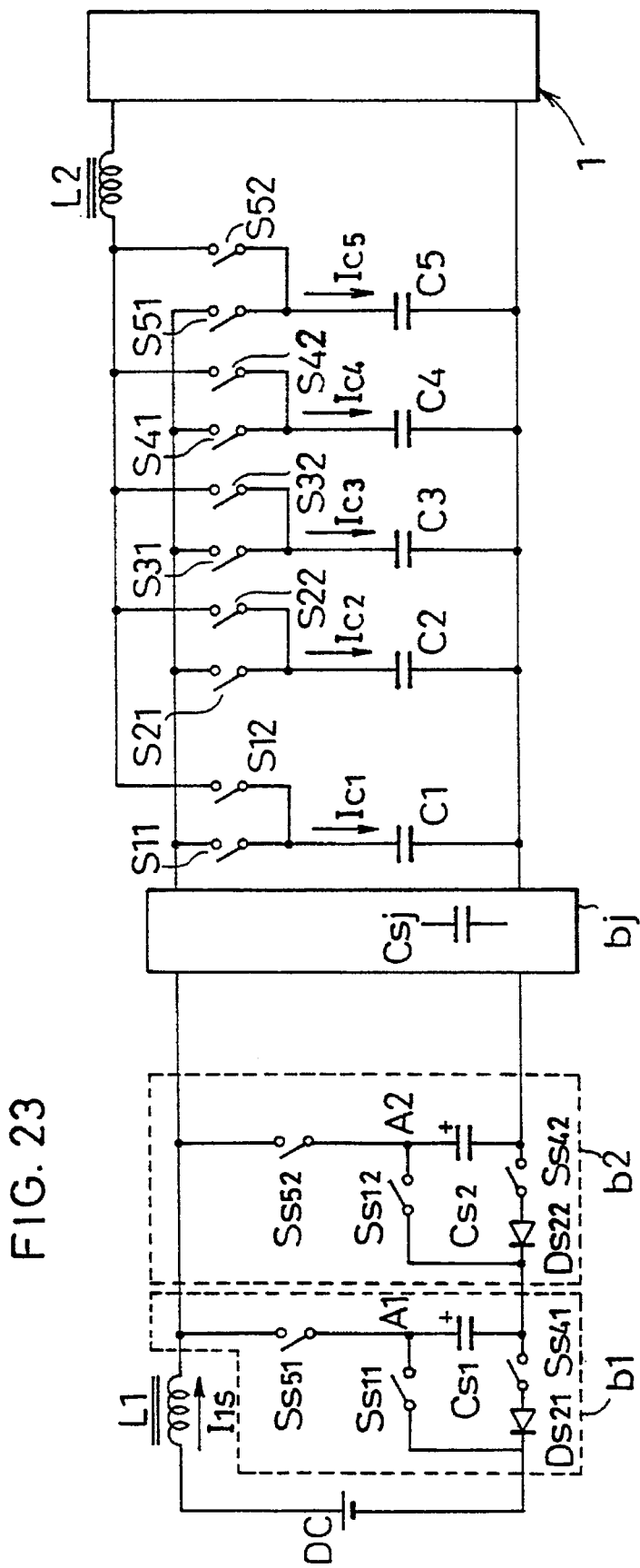
FIG. 23 is a circuit diagram of Embodiment 17 according to the present invention.

Embodiment 17 has such circuit arrangement as shown in FIG. 23.

The distinction of Embodiment 17 from Embodiment 16 shown in FIG. 22 resides in that jn(j1–n) sets of the current control section b are provided so that the capacitors C1–C5 will be charged with the number of current controlling capacitors Csj in series connection to the source DC varied in accordance with the set voltages of the capacitors C1–C5. Since other constituents are the same as those in Embodiment 16, they are denoted by the same reference numbers, and their elucidation is omitted.

The operation of Embodiment 17 shall be briefly explained next.

In the event where the set voltages V1–V5 upon completion of the charging of the capacitors C1–C5 are, with the source voltage E employed, more than mE (m+1)+less than E (m=1 to j), the capacitors C1–C5 are charged by connecting in series "m" capacitors Cs to the DC power source DC. When the both end voltages Vc1–Vc5 substantially reach the set voltages V1–V5, at least one of the capacitors Csj (j=1 to n) is removed from the current path or is made to be of inverse polarity.

The respective capacitors Cs are assumed to have been charged to the E level from the source DC through the inductor L1 so that, in the event where the set voltage V5 of the capacitor C5, for example, is more than 3E but less than 4E, three capacitors Cs are connected in series to the source DC of the source voltage E, the capacitors Cs are charged with E+4Vcs=DC. As the capacitor C5 is charged substantially to the predetermined voltage, at least this capacitor C5 is removed from the current path, and 3E is applied to the capacitor C5, whereby 3E<Vc<5E is attained, and the charge current is reduced abruptly. With respect to other capacitors C1–C4, too, the charge current can be reduced abruptly.

With the foregoing arrangement employed, the capacitors C1–C5 can be charged with such very high voltage as j+1 (j=1 to n) times as large as the source voltage E, and any differential voltage between the series voltage of the source DC and capacitor Csj and the set voltages V1–V5 can be made small, whereby the peak of current can be reduced, and the circuit efficiency can be improved.

The operation may also be so made that different initial voltages are set for the respective capacitors Cs so that the current controlling capacitor Cs to be connected in series to the source DC will be selected in conformity to the set voltages V1–V5 of the capacitors C1–C5, while other capacitors Cs are removed from the current path and are actuated to minimize the differential voltage between the series voltage of the source DC and capacitor Csj and the set voltages V1–V5.

EMBODIMENT 18

Figure 24:
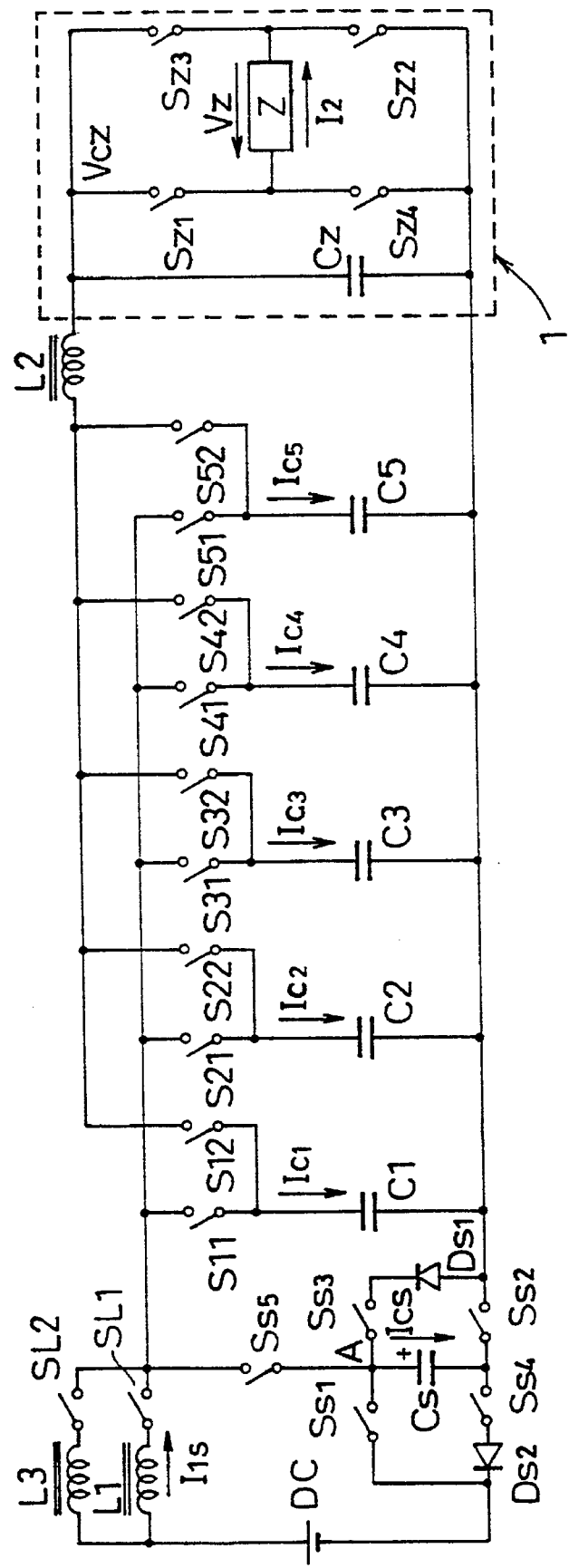
FIG. 24 is a circuit diagram of Embodiment 18 according to the present invention.
Figure 25:
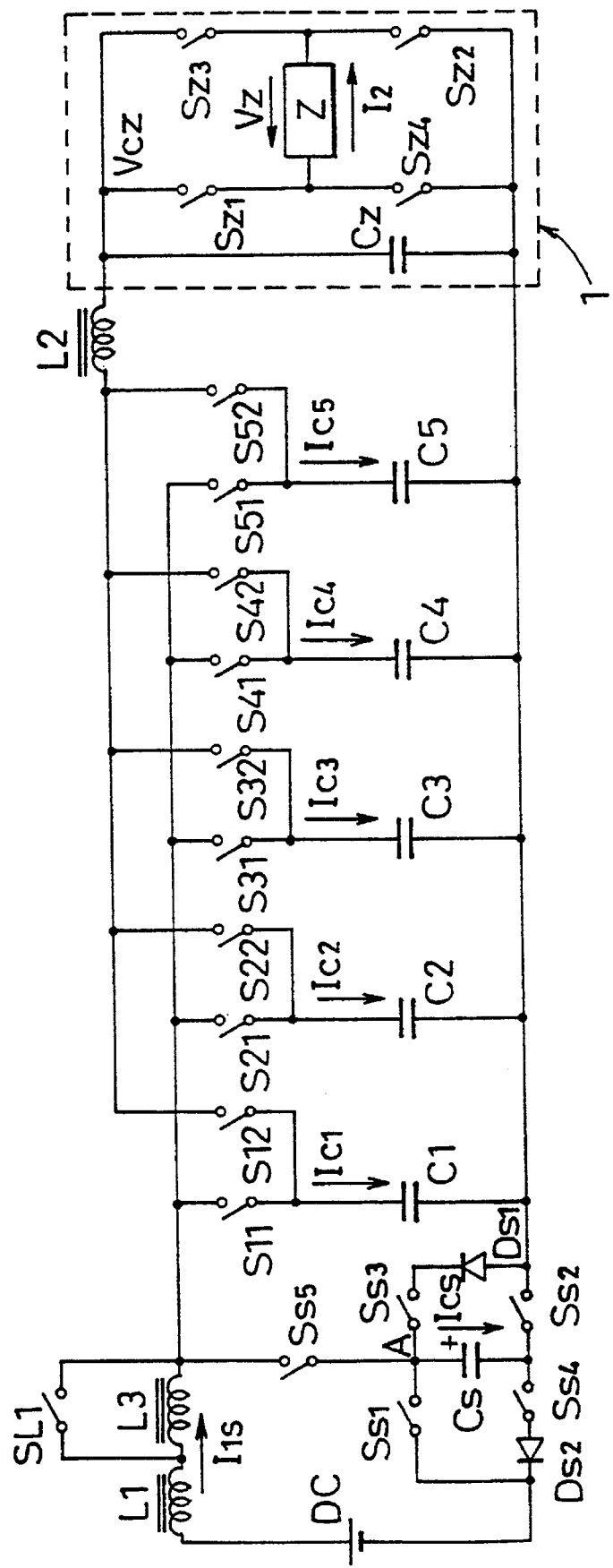
FIG. 25 is a circuit diagram of Embodiment 19 according to the present invention.

In FIG. 24, a circuit diagram of Embodiment 18 is shown. The distinction of this Embodiment 18 from the foregoing Embodiment 15 shown in FIG. 20 resides in that the circuit is so arranged that a switching element SL1 is connected in series with the inductor L1, and a series circuit of an inductor L3 (>the inductor L1) and a switching element SL2 is connected in parallel to the series circuit of the inductor L1 and switching element SL1 so that, upon the normal operation, the switching element SL1 is made ON and the switching element SL2 is turned OFF, whereas, upon the high voltage charging, the switching element is turned OFF and the switching element SL2 is made ON, so as to change over the inductors L1 and L3. Other constituents identical to those in the foregoing Embodiment 18 are denoted by identical reference numbers and their elucidation are thereby omitted.

EMBODIMENT 19

A circuit diagram of Embodiment 19 is shown in FIG. 24. The distinction of this Embodiment 19 from Embodiment 18 shown in FIG. 24 resides in that the inductors L1 and L3 are connected in series, and the switching element SL1 is connected in parallel to and across both ends of the inductor L3 so that, upon the normal operation, the switching element SL1 is made ON to minimize the inductance but, upon the high voltage charging, the switching element SL1 is turned OFF to utilize a large inductance. Other constituents identical to those in Embodiment 18 are denoted by identical reference numbers and their elucidation is omitted.

Since, in the foregoing Embodiments 18 and 19, the differential potential between the series voltage of the source DC and capacitors Csj and the set voltages Vc1–Vc5 becomes large during the charging operation to the high voltage, the selective variation of the inductance enables to restrain the current peak and to improve the circuit efficiency.

EMBODIMENT 20

Figure 26:
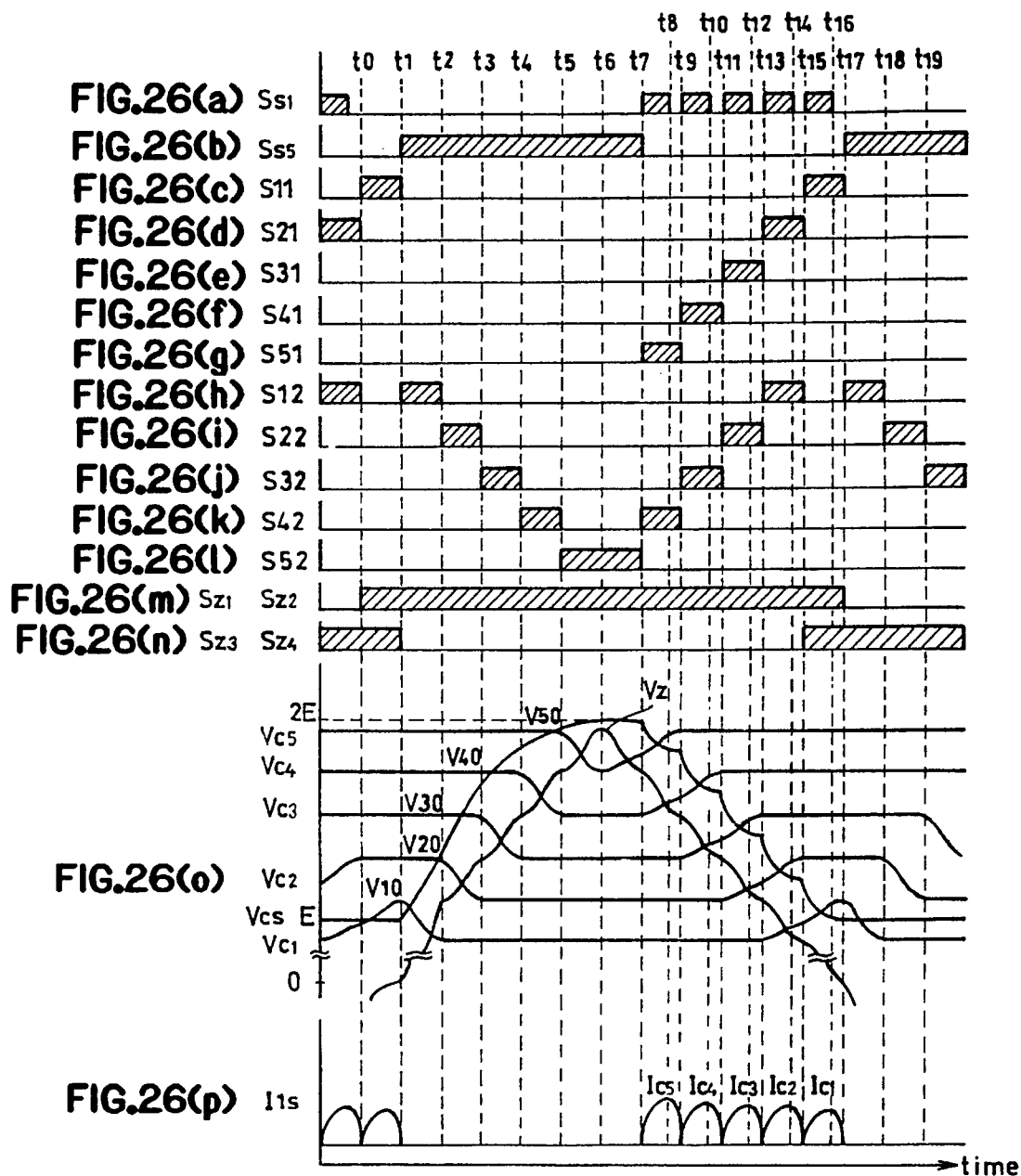
FIGS. 26(a) to 26(p) are operational waveform diagrams for Embodiment 20 according to the present invention.

The operation of this Embodiment 20 shall be explained with reference to FIG. 26. Other constituents of this Embodiment are the same as those in Embodiment 16 of FIG. 22.

The distinction from the operation of Embodiment 16 resides in that the plurality of capacitors C1–C5 are charged by the series circuit of the DC power source DC and charge current controlling capacitor Cs through the switching elements S11–S51 and inductor L1, sequentially from one of the capacitors higher in the set voltage to others, and the capacity of the charge current controlling capacitor Cs is so set as to cause the voltage of this capacitor Cs to drop following the respective set voltages of the capacitors C1–C5, so that the potential difference between the grand sum of the voltage of the series circuit of the source DC and capacitor Cs and the voltages upon starting of the charging of the respective capacitors C1–C5 can be minimized. Other constituents the same as those in Embodiment 16 are denoted by the same reference numbers and their elucidation is omitted.

Next, the operation shall be briefly explained with reference to FIG. 26. In this connection, the operation of supplying the power to the load circuit 1 from the plurality of capacitors C1–C5 through the switching elements S12–S52 and inductor L2 is the same as that in Embodiment 16, and the explanation shall be limited to the charging operation of the capacitors C1–C5 only.

The charge current controlling capacitor Cs is charged to the initial voltage (=E) with the switching element Ss5 made ON for a period from time t1 to time t7, at the latter of which the switching elements Ss1 and S51 are turned ON as shown in FIGS. 26(a) and 26(g), so as to charge the capacitor C5 by causing a current Ic5 to flow through a path of the DC power source DC→inductor L1→switching element S51→ capacitor C5→charge current controlling capacitor Cs→switching element Ss1→the source DC. As shown in FIG. 26(a), the switching element Ss1 is turned OFF immediately before the set voltage V50 of the capacitor C5 is reached by its charged voltage (t10), the current Ic5 is thereby caused to flow through a path of the source DC inductor L1 switching element S51 capacitor C5 diode DS the source DC, and this current Ic5 is abruptly reduced as to be E Vc5 so as to separate the charge current controlling capacitor Cs from the current path. Here, the capacity of the capacitor C5 is so set that the voltage Vcs of the charge current controlling capacitor Cs drops to be close to the set voltage V40 of the capacitor C4 being charged next. At time t9 when the current Ic5 becomes zero, the switching element S51 is turned OFF while the switching elements Ss1 and S41 are turned ON as shown in FIGS. 26(a), 26(f) and 26(g), so as to separate the capacitor C5 from the power source for holding the set voltage, and the capacitor C4 is charged by means of the current Ic4 made to flow through a path of the source DC inductor L1→switching element S41→capacitor C4→charge current controlling capacitor Cs→switching element Ss1→the source DC. In similar manner, the capacitors C3 to C1 are sequentially charged, so that the value Vcs→E at time t17 will be substantially equal to the value at time t1, as shown in FIG. 26(o).

With the foregoing arrangement, it is made possible to minimize the capacity of the charge current controlling capacitor Cs, and the reduction in the peak current and noise as well as the improvement in the circuit efficiency by minimizing the potential difference between the grand sum of voltages of the power source DC and charge current controlling capacitor Cs and the initial charge voltages Vc1–Vc5 are made possible.

EMBODIMENT 21

Figure 27:
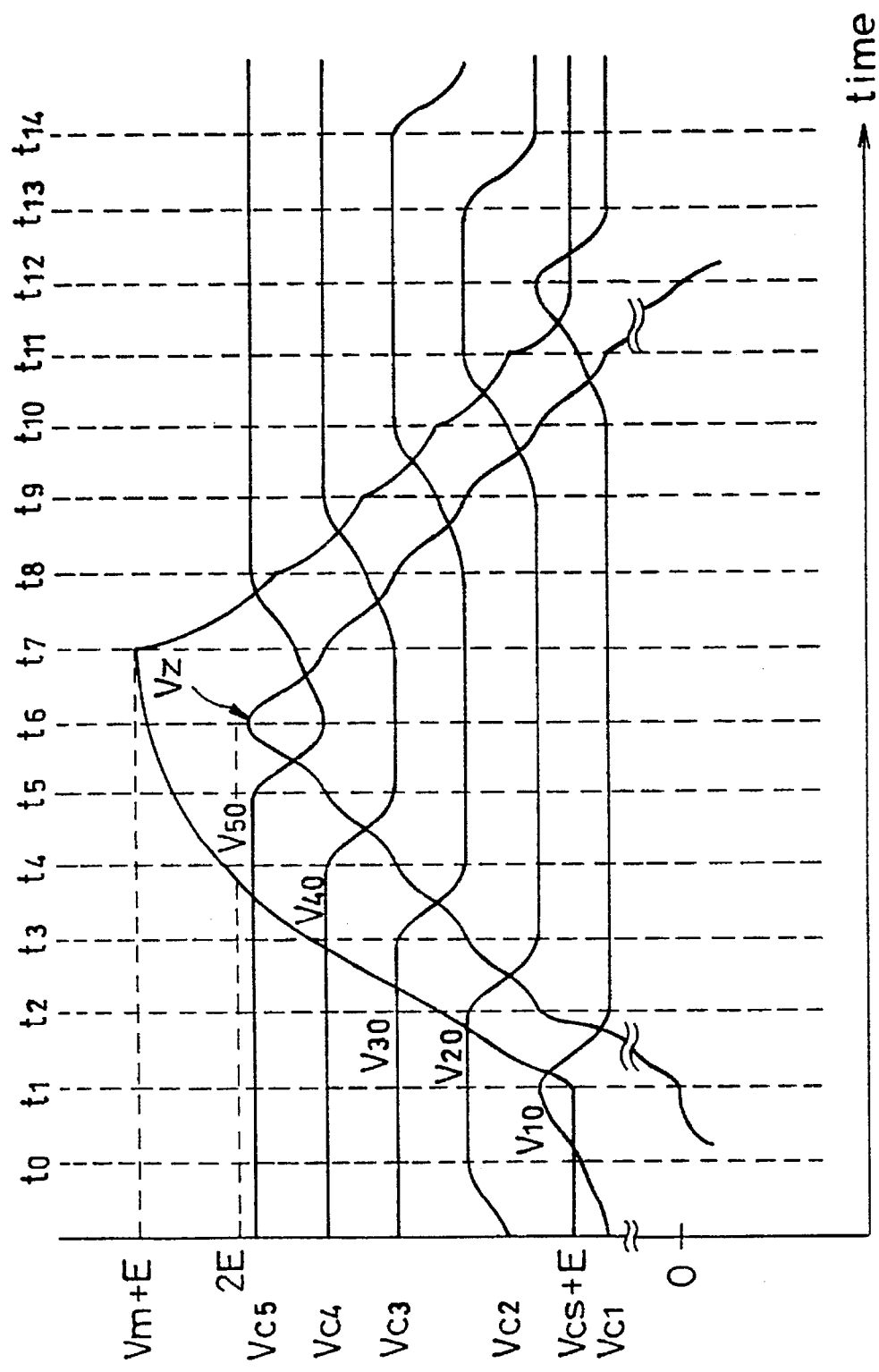
FIG. 27 is an explanatory diagram for the operation of Embodiment 21 according to the present invention.

FIG. 27 is an explanatory diagram for the operation of the present Embodiment 21. In this case, the circuit arrangement itself may be such one as shown in FIG. 22.

The distinction in the operation from Embodiment 20 shown in FIG. 22 is that the voltage Vcs is raised to a voltage Vm (>2E) by charging the charge current controlling capacitor Cs with the grand sum of energies of the power source DC and inductor L1 in the period from time t1 to time t7. All other constituents identical to those in Embodiment 20 are denoted by identical reference numbers, and their explanation is omitted.

Since in this manner the voltage drop of the charge current controlling capacitor Cs can be made further remarkable, it is enabled to further minimize the capacity of this capacitor Cs, and the peak current reduction, noise reduction and circuit efficiency improvement in respect of the circuit can be realized.

EMBODIMENT 22

Figure 28:
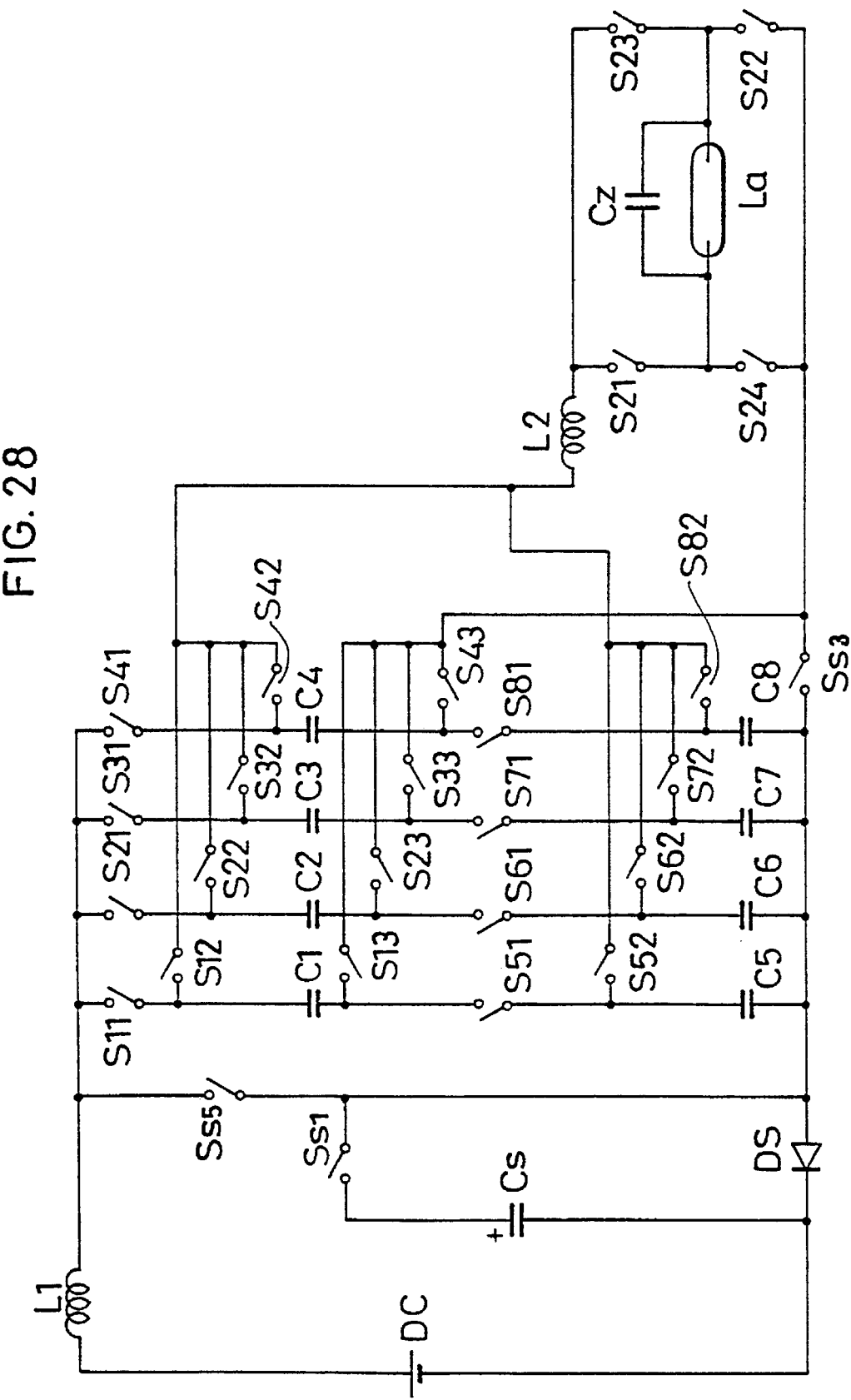
FIG. 28 is a circuit diagram of Embodiment 22 according to the present invention.
Figure 29:
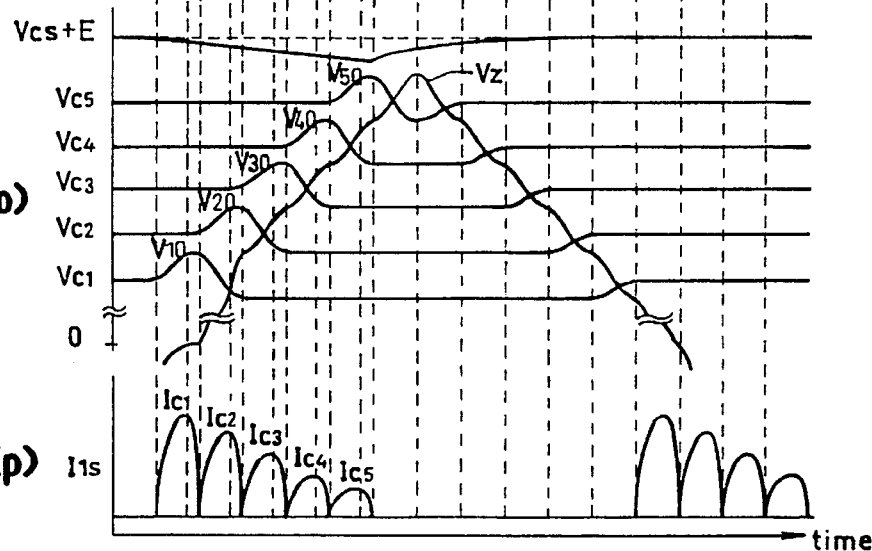
FIGS. 29(a) to 29(p) are operational waveform diagram for Embodiment 22 of FIG. 28.

For the present Embodiment 22, its circuit diagram is shown in FIG. 28 and its operational waveform diagram is shown in FIG. 29. The distinction of this Embodiment 22 from Embodiment 20 of FIG. 22 resides in that, while in Embodiment 20 a plurality of the capacitors are charged sequentially one by one, an arrangement for charging more than two capacitors as connected in series to the series circuit of the power source DC and charge current controlling capacitor Cs, or an arrangement including the same measure for controlling the capacity of the capacitor Cs as that in Embodiment 20 and, in addition, a measure for charging sequentially from the series circuit of more than two capacitors of high set voltages, will be employed so that the potential difference between the sum of the voltages of the source DC and the charge current controlling capacitor Cs and the sum of the voltages of the more than two capacitors will be minimized, and other constituents identical to those in Embodiment 20 are denoted by identical reference numbers and their elucidation is omitted.

In this Embodiment 22, it is made possible to reduce the peak current and noise within the circuit and to improve the circuit efficiency.

Figure 30:
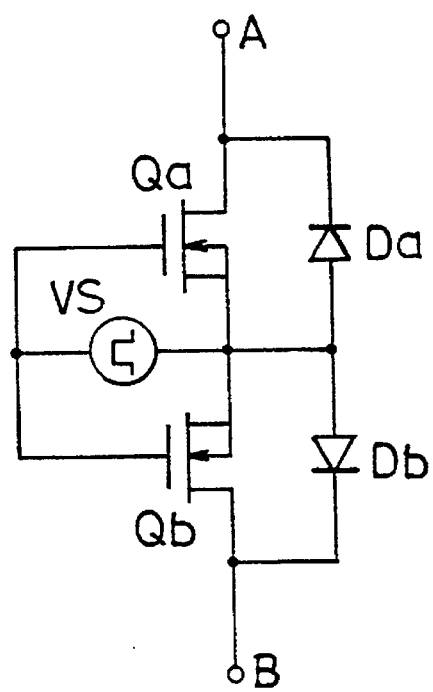
FIG. 30 is a circuit diagram of a bilateral switch employed in the respective foregoing embodiments, in an aspect where the switch is formed with MOSFETs.
Figure 31:
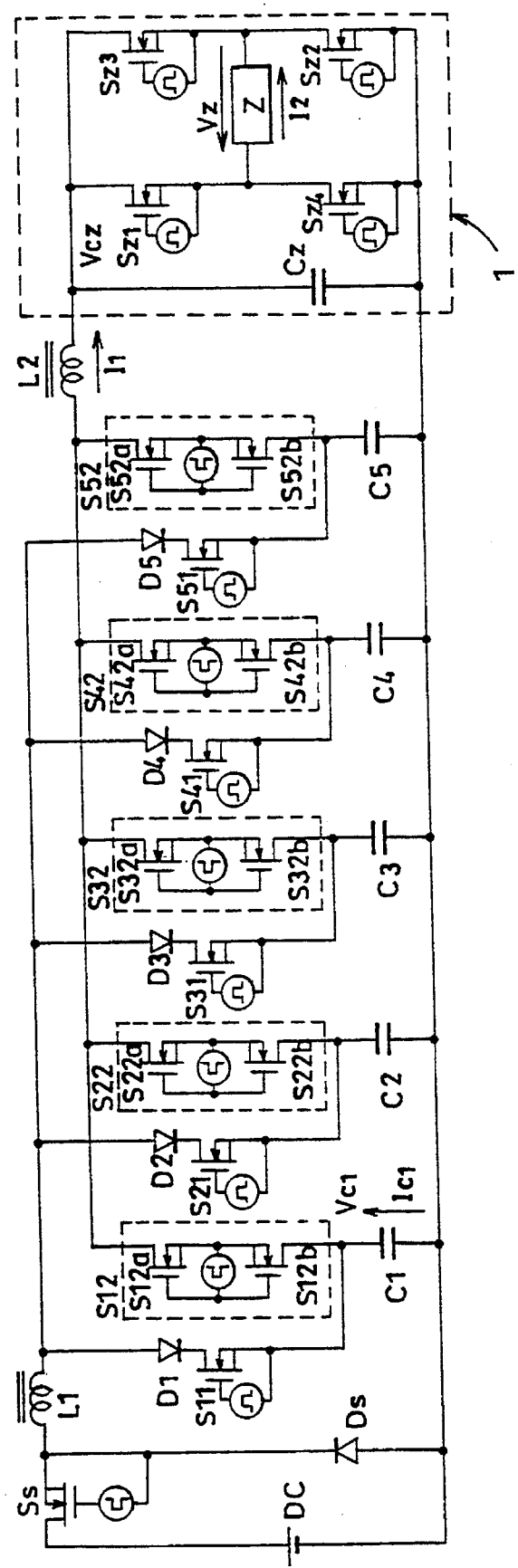
FIG. 31 is a circuit diagram in an aspect of the circuit of Embodiment 6 in FIG. 7 with MOSFETs employed.

In the foregoing Embodiment 1–22, the current I1 flowing from the respective capacitors C1–C5 to the load circuit 1 is made to flow from the respective capacitors C1–C5 to the load circuit 1 when the load voltage Vz rises, but from the load circuit to the respective capacitors C1–C5 when the load voltage Vz drops. That is, the current flows bilaterally through the switching elements S12–S52. As the circuit arrangement for controlling the bilateral current with such unilateral device as bipolar transistor, MOSFET or the like employed, there may be employed such arrangement as shown in FIG. 30, for example, in which MOSFETs Qa and Qb having body diodes Da and Db between the gate and source are mutually connected at the sources and connected at their drains A and B to the current path. It is made possible to flow a bilateral current to the MOSFETs Qa and Qb by applying a control signal VS across the gate and source of these MOSFETs Qa and Qb as shown in FIG. 30. In FIG. 31, there is shown a circuit diagram in which all switching elements employed in such circuit of Embodiment 6 as shown in FIG. 7 are replaced by MOSFETs having the body diodes between the gate and source.

Figure 32:
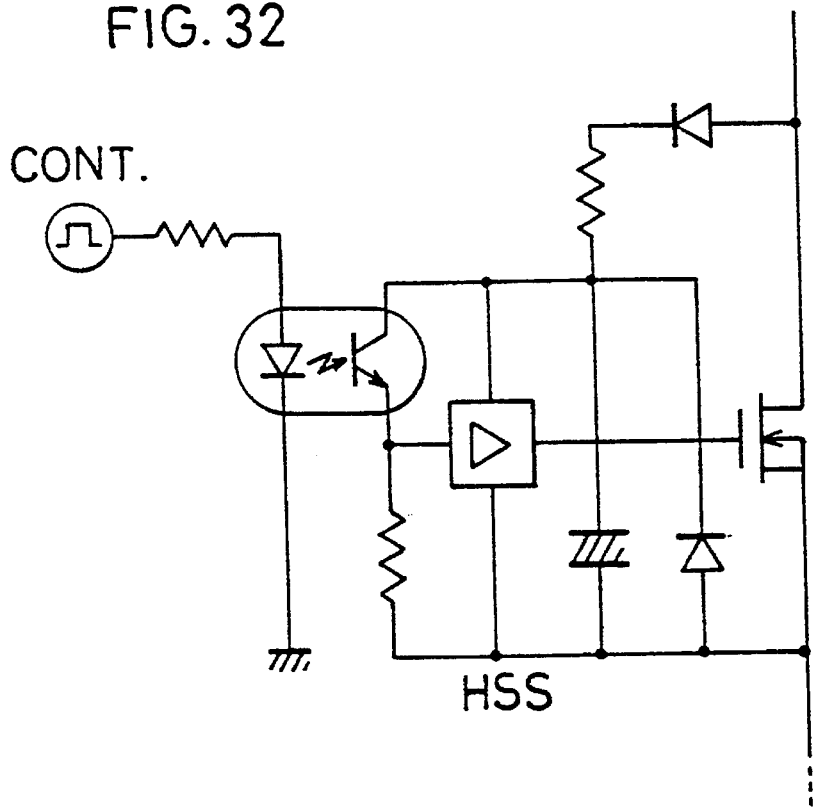
FIG. 32 is a diagram showing a drive circuit for a high-side switch employed in the above Embodiment.

When the MOSFETs in the circuit shown in FIG. 31 are high side switches which are unstable in the source potential, the high side switches HSS are respectively driven by means of such transmitting and driving circuit of a control signal CONT as shown in FIG. 32. Further, the MOSFETs Sj2a and Sj2b forming the bilateral switching elements as shown in FIG. 30 are caused to act as the switching elements S12–S52 by a simultaneous application of control signals VS, and their operation is proportionate to the operational waveform diagrams shown in FIG. 2.

EMBODIMENT 23

Figure 33:
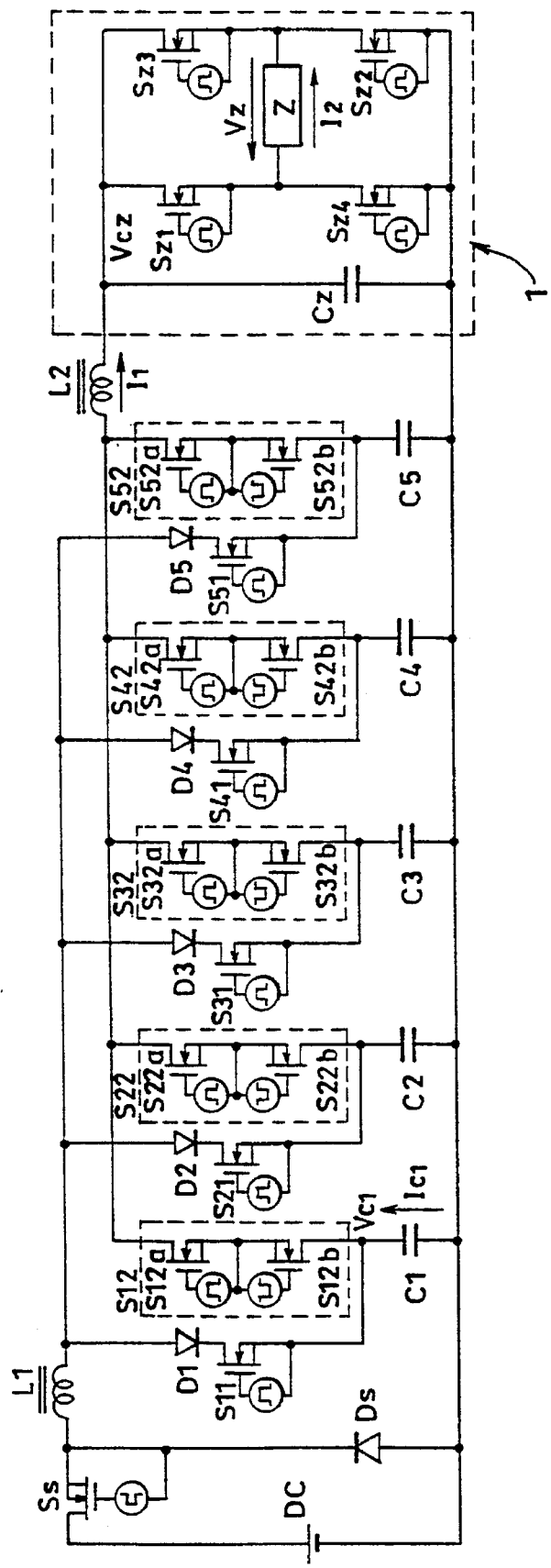
FIG. 33 is a circuit diagram of Embodiment 23 according to the present invention.

In respect of Embodiment 23 of the present invention, its circuit diagram is shown in FIG. 33, circuit diagram of the switching elements S11–S51 is shown in FIG. 23, and operational waveform diagrams are shown in FIG. 35.

In the present Embodiment 23, the switching elements S12–S52 controlling the bilateral current in Embodiments 1–22 are constituted by the MOSFETs Qa and Qb having the body diodes and are disposed to be respectively independently provided across the gate and source with the control signals VSa and VSb. Other constituents identical to those in FIG. 31 are denoted by identical reference numbers and their elucidation is omitted.

Next, the operation of this Embodiment 23 shall be briefly explained with reference to FIG. 35.

From time t0 to time t5 for which the current I1 is made to flow from the capacitors C1–C5 to the load circuit 1, the MOSFETs Sj2s (j=1 to 5) are turned OFF while the MOSFETs Sj2b (j=1 to 5) are turned ON, and the capacitors C1–C5 are connected through the inductor L2 to the load circuit 1. When, for example, the control signal to the MOSFET S32b is made high level at time t2, the current flows through a path of the capacitor C3→MOSFET S32b→ body diode of MOSFET S32a inductor L2→load circuit 1. At this time, even if the MOSFET S22b made ON from time t1 to time t2 has not been completely turned OFF, no current flows from the capacitor C3 into the capacitor C2 since the MOSFET S22a is in OFF state.

From time t5 to time t10 for which the current I1 is made to flow through the body diodes of the MOSFETs Sz1–Sz4 forming the load circuit 1 to the capacitors C1–C5, on the other hand, the MOSFETs Sj2a (j=1 to 5) are made ON while the MOSFETs Sj2b (j=1 to 5) are turned OFF, and the capacitors C1–C5 are connected through the inductor L2 to the load circuit 1. When, for example, the MOSFET S42a is made ON from time t6 to time t7 while the control signal of MOSFET S42a becomes low level and the control signal of MOSFET S32a becomes high level, then the MOSFET S32a is also made ON. Even if MOSFET S42a has not been completely in OFF state, the MOSFET S42a is turned to be OFF, and there flows no current from the capacitor C4 to the capacitor C3. Since the voltage of the capacitor C3 is lower than the load circuit 1, there flows a current from the load circuit 1 to the capacitor C3.

From time t4 to time t5, the capacitor C5 is connected to the load circuit 1 to cause a current to resonantly flow, so that there occurs an event where the period in which the current flows from the capacitor C5 to the load circuit 1 and the other period in which the current flows from the load circuit 1 to the capacitor C5 can hardly be distinguished from each other. In this event, MOSFET S52b is made ON from time t5 to time t6 and to be completely turned OFF at time t6 and MOSFET S42b is completely turned OFF prior to time t5 and thereafter MOSFET S52a is made ON, whereby a period in which MOSFETs S52a and S52b are simultaneously turned ON is provided, so as to have the bilateral switching operation executed.

Figure 36:
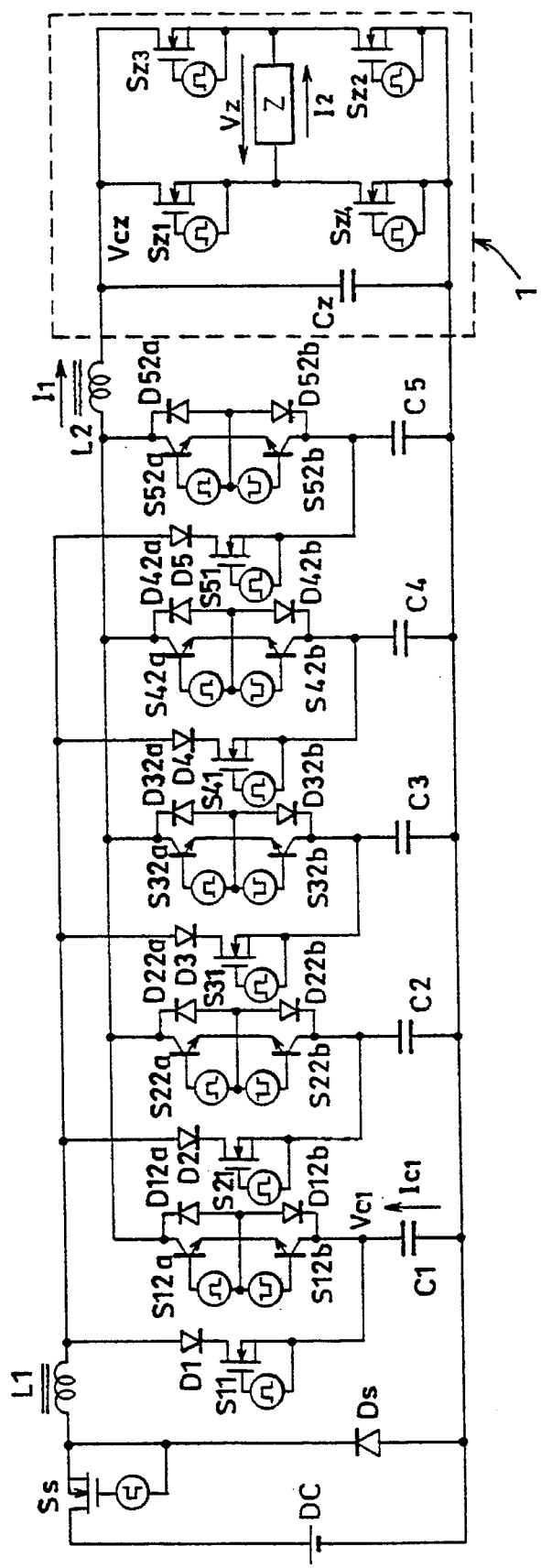
FIG. 36 is a circuit diagram in an aspect of Embodiment 23 in FIG. 33 with bipolar transistors employed as the bilateral switches.

With the foregoing arrangement employed, any turn-OFF delay of the bilateral switches may not be taken into account, the controlling arrangement can be simplified, and it is made possible to employ even a switching device slow in the turning ON and OFF. Further, MOSFETs Qa and Qb may be replaced by an arrangement comprising, as shown in FIG. 36, bipolar transistors and diodes Dj2a and Dj2b (j=1 to 5) connected inverse parallel to the bipolar transistors. Further, in place of the bipolar transistors, a MOSFET having no body diode may also be used.

EMBODIMENT 24

Figure 37:
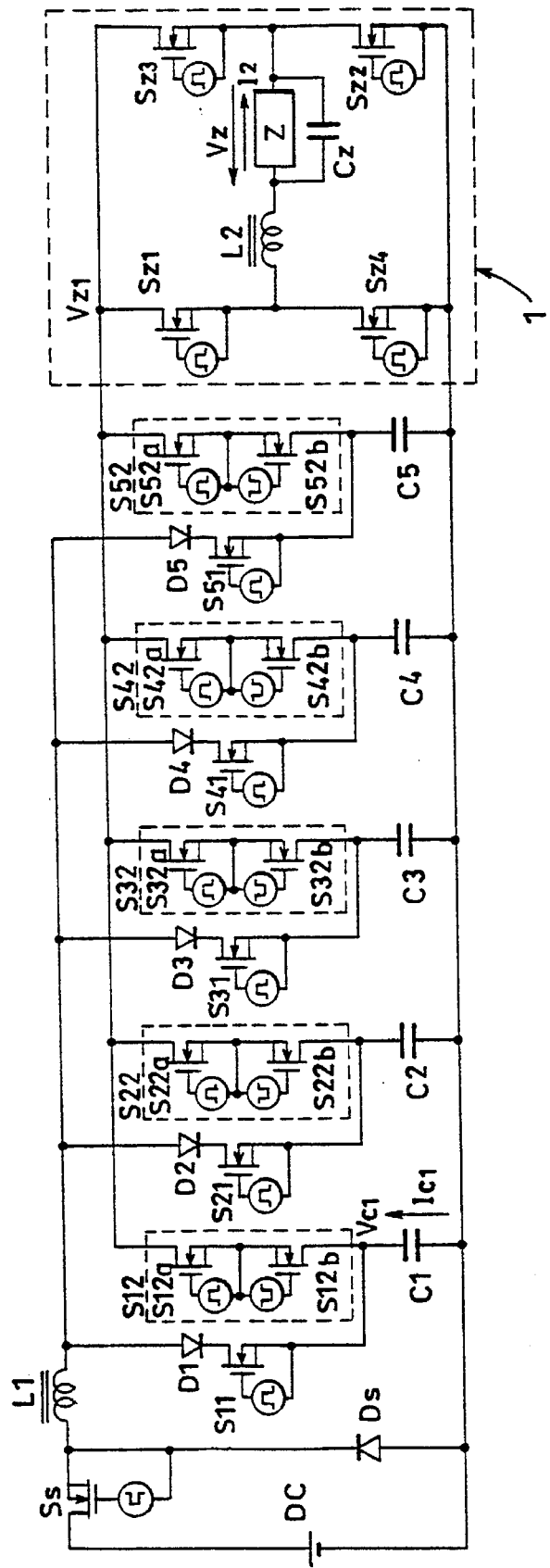
FIG. 37 is a circuit diagram of Embodiment 24 according to the present invention.
Figure 38:
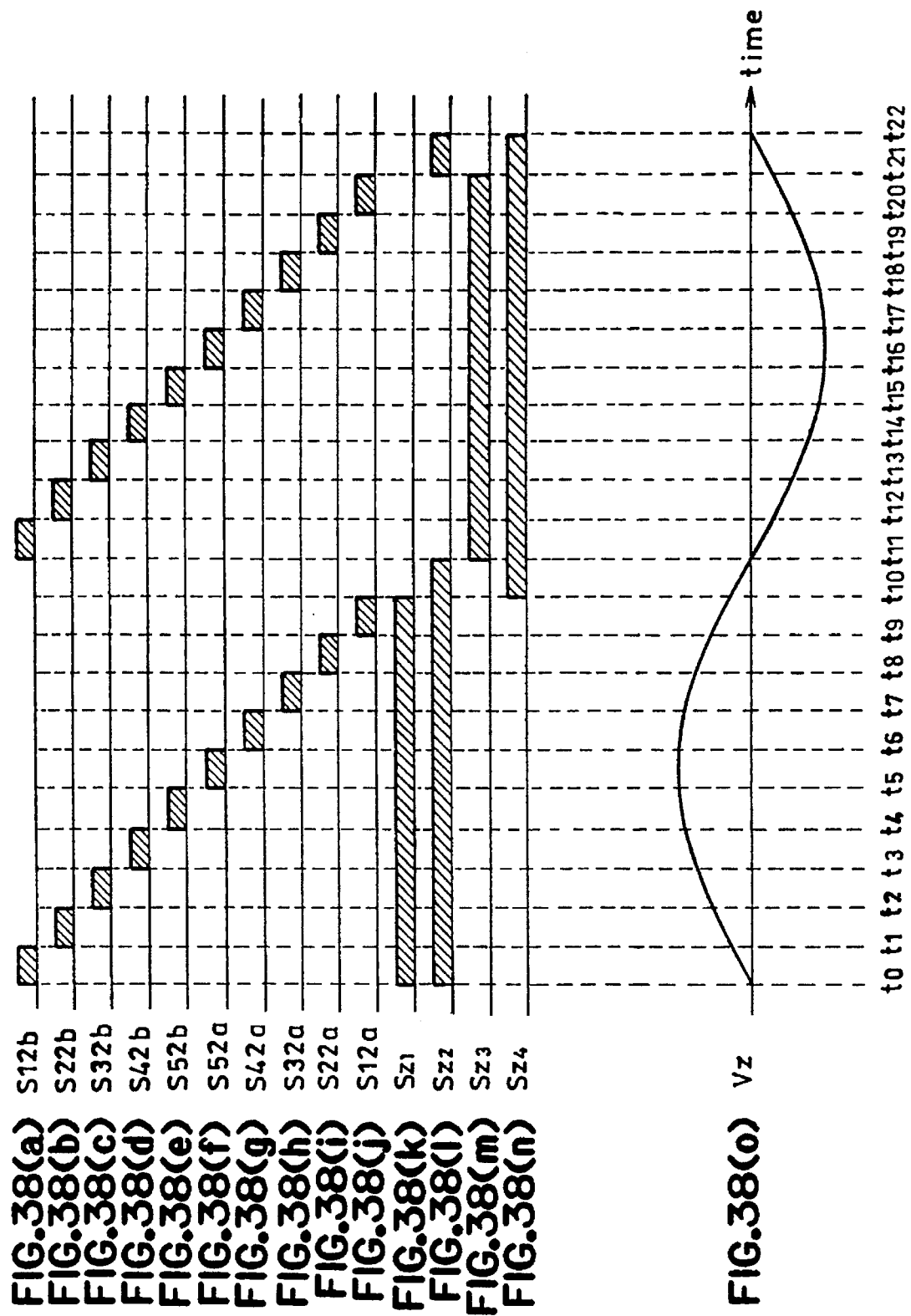
FIGS. 38(a) to 38(o) are operational waveform diagrams for Embodiment 24 of FIG. 37.

In respect of Embodiment 24, its circuit diagram is shown in FIG. 37 and its operational waveform diagrams are shown in FIG. 38.

The distinction from Embodiment 23 shown in FIG. 33 resides in the load circuit 1 in which the load Z to which the load-use capacitor Cz is connected in parallel and the inductor L2 is connected in series is disposed within a full-bridge circuit of at least MOSFETs Sz1–Sz4, so that any bidirectional switching element may not be used for the MOSFETs Sz1–Sz4 in order to return the power from the load circuit 1 to the power supplying capacitors C1–C5. Other constituents identical to those in Embodiment 23 are denoted by identical reference numbers and their elucidation is omitted.

Next, the operation of Embodiment 24 shall be briefly explained with reference to FIG. 38.

In a period from time t0 to time t10, MOSFETs Sz1 and Sz2 are made ON to render the load voltage Vz to be in positive voltage. As MOSFET S12b is made ON at time t0, for example, a current Ic1 is caused to flow through a path of the capacitor C1→MOSFET S12b→body diode of MOSFET S12a→MOSFET Sz1→inductor L2→parallel circuit of the load-use capacitor Cz and load Z→MOSFET Sz2 capacitor C1, and the power is supplied to the load Z. In a period from time t1 to time t5, too, a power is supplied similarly from the capacitors C2–C5 through MOSFETs Sz1 and Sz2 to the load Z. In returning the power from the load-use capacitor Cz to the capacitor C5 (time t5), MOSFET S52a is made ON, a current is caused to flow through a path of the inductor L2→body diode of MOSFET Sz1→ MOSFET S52a→body diode of MOSFET S52b→capacitor C5→body diode of MOSFET Sz2. Since at this time MOSFETs Sz3 and Sz4 are in OFF state, there flows no current through a path of the load-use capacitor Cz inductor L2 body diode of MOSFET Sz1→MOSFET Sz3→load-use capacitor Cz, or a path of the load-use capacitor Cz→inductor L2→MOSFET Sz4→body diode of MOSFET Sz2→load-use capacitor Cz.

From time t10 to time t11, MOSFETs Sz2 and Sz4 are turned ON to separate the capacitors C1–C5 from the load Z, whereby a current is caused to flow through a path of the load-use capacitor Cz→inductor L2→MOSFET Sz4→ MOSFET Sz2→load-use capacitor Cz and the voltage of the load-use capacitor Cz is made zero. In a period from time t11 to time t22, MOSFETs Sz3 and Sz4 are made ON, and the load voltage Vz is rendered to be of a negative voltage.

MOSFETs Qa and Qb may be replaced by bipolar transistors and diodes Dj2a and Dj2b (j=1 to 5) connected inverse parallel to the bipolar transistors, as shown in FIG. 36. Further, in place of the bipolar transistor, a MOSFET having no body diode may also be employed.

EMBODIMENT 25

Figure 34:
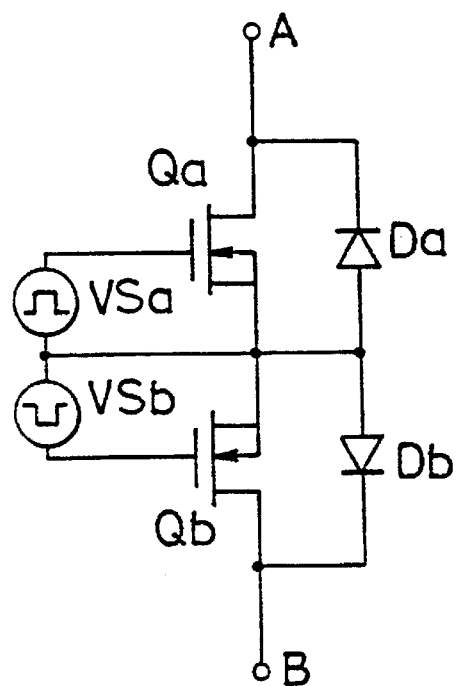
FIG. 34 is a circuit diagram of a bilateral switch employed in Embodiment 23 of FIG. 33.
Figure 39:
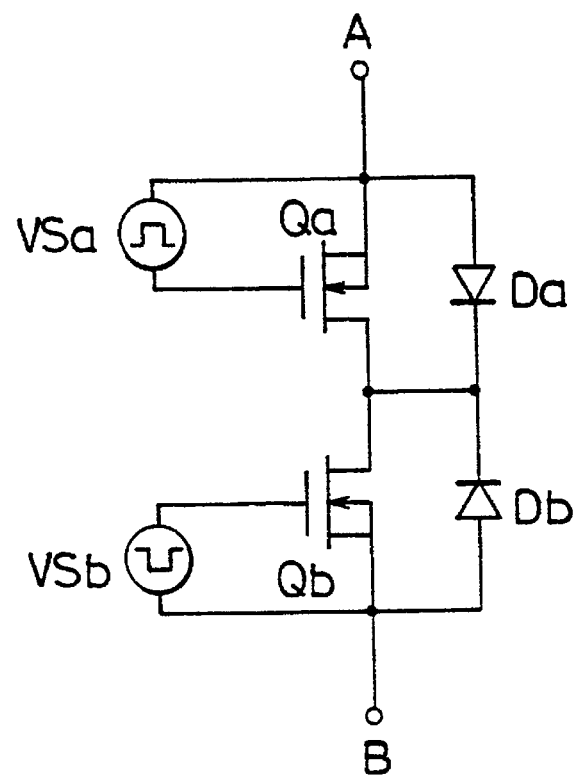
FIG. 39 is a circuit diagram of a bilateral switch employed in Embodiment 25 according to the present invention.
Figure 40:
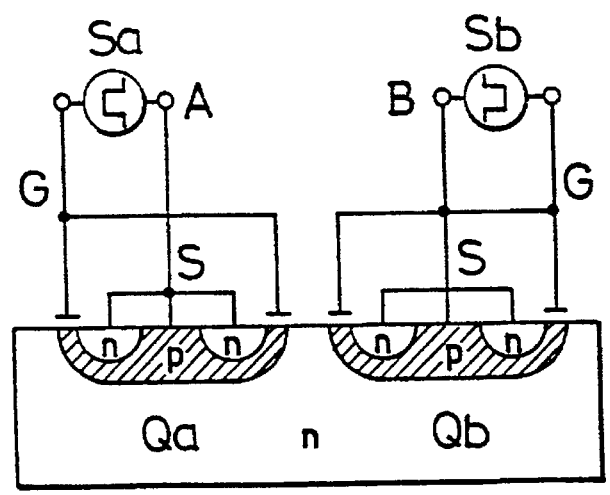
FIG. 40 shows in a schematic cross section of an aspect in which the bilateral switch employed Embodiment 25 according to the present invention, as mounted on a monolythic state.

For Embodiment 25, its two-way switching element of circuit diagram is shown in FIG. 39 and its semiconductor structure is shown in FIG. 40. The distinction from Embodiment 23 shown in FIG. 34 resides in that vertical MOSFETs Qa and Qb are employed with their drains mutually connected. Other constituents identical to those in Embodiment 23 are denoted by identical numbers and their elucidation is omitted.

With the foregoing arrangement employed, the vertical MOSFETs Qa and Qb of which drains can be used in common as shown in FIG. 40 enable it possible to manufacture them in monolythic and can be easily used as being a single device. In the present embodiment, a VDMOS structure is shown in FIG. 40, but any other element may be employed so long as the same has the vertical structure, and the structure may also be used in the foregoing Embodiments 23 and 24.

Further, in the foregoing Embodiments, the switching elements slow in the turning OFF may properly be employed.

What is claimed is:

1. A power converting system comprising a load, a plurality of capacitors, a charge section for charging the respective capacitors to render their terminal voltages to be mutually different predetermined voltages, a load-use capacitor acting as a power source for the load, an inductor connected in series to the load-use capacitor, a plurality of switching elements respectively inserted between a series circuit of the load-use capacitor and inductor and the respective capacitors, and a control circuit for controlling the switching elements to vary both end voltages of the load-use capacitor into a pulsating waveform by sequentially connecting the respective capacitors alternatively to the series circuit.

2. The converting system according to claim 1, wherein the control circuit is arranged for controlling the switching elements such that, after connecting the respective capacitors to the series circuit of the load-use capacitor and inductor, the capacitor connected to the series circuit is separated at an initial zero cross point of a current passing through the inductor.

3. The converting system according to claim 1, wherein the control circuit is arranged for controlling the switching elements such that, after connecting the respective capacitors to the series circuit of the load-use capacitor and inductor, the capacitor connected to the series circuit is separated prior to an initial zero cross point of a current passing through the inductor.

4. The converting system according to claim 1, wherein the terminal voltages upon charging of the respective capacitors by the charge section are set so that both end voltages of the load-use capacitor are made to be in a sinusoidal wave shape.

5. The converting system according to claim 1, wherein the control circuit is arranged for controlling the connection time of the respective capacitors by means of the switching elements so that both end voltages of the load-use capacitor are in a sinusoidal wave shape.

6. The converting system according to claim 1, wherein the respective capacitors have a capacity so as to render both end voltages of the load-use capacitor to be in a sinusoidal wave shape.

7. The converting system according to claim 1, includes an inverter circuit for supplying to the load AC power with the load-use capacitor used as a power source.

8. The converting system according to claim 1, wherein the capacitors are arranged in two groups respectively including a plurality of the capacitors, the charge section is provided for charging these two groups of the capacitors, the groups being arranged for being alternately connected to the series circuit, and the control circuit includes a plurality of switching elements for controlling the two groups of the capacitors.

9. The converting system according to claim 1, wherein the load is a discharge lamp.

10. A power converting system comprising a load, a plurality of power supplying capacitors, a first inductor connected in series to a DC power source, means for charging through the first inductor the respective power supplying capacitors to a predetermined voltage, a load-use capacitor acting as a power source to the load, a second inductor connected in series to the load-use capacitor, a plurality of switching means connected respectively in series between a series circuit of the load and the second inductor and the respective power supplying capacitors, a control means for connecting the respective switching means sequentially alternatively to the series circuit of the load and the second inductor to vary both end voltages of the load-use capacitor to a pulsating wave shape, a charge current controlling capacitor for controlling a charging current to the respective power supplying capacitors, and means for charging and discharging the charge current controlling capacitor.

11. The converting system according to claim 10, wherein the control means is arranged for connecting in series the charge current controlling capacitor to a charge current path for the respective power supplying capacitors to render the charge current controlling capacitor and the DC power source to be inverse polarity.

12. The converting system according to claim 10, wherein the control means is arranged for charging the respective power supplying capacitors to be above the source voltage by connecting in series the charge current controlling capacitor to the charge current path for the respective power supplying capacitors to render the charge current controlling capacitor and the DC power source to be the same polarity.

13. The converting system according to claim 10, wherein the control means is arranged for charging the respective power supplying capacitors to be above the source voltage by connecting in series the charge current controlling capacitor to the charge current path for the respective power supplying capacitors to render the charge current controlling capacitor and the DC power source to be the same polarity, and for removing the charge current controlling capacitor from the charge current path for the respective power supplying capacitors when the power supplying capacitor is charged to the predetermined voltage.

14. The converting system according to claim 10, wherein the control means is arranged for charging the respective power supplying capacitors to be above the source voltage by connecting in series the charge current controlling capacitor to the charge current path for the respective power supplying capacitors to connect in series an optional plurality of the charge current controlling capacitors and to render the series circuits of the charge current controlling capacitors and the DC power source to be the same polarity, and for connecting in series the charge current controlling capacitor to the charge current path for the respective power supplying capacitors to render the charge current controlling capacitors and the DC power source to be the inverse polarity, when the power supplying capacitors are charged to the predetermined voltage.

15. The converting system according to claim 10, wherein the control means is arranged for charging the respective power supplying capacitors to be above the source voltage by connecting in series the charge current controlling capacitor to the charge current path for the respective power supplying capacitors to render the charge current controlling capacitor and the DC power source to be the same polarity, and for removing the charge current controlling capacitors from the charging path for the power supplying capacitors when the power supplying capacitors are charged to the predetermined voltage.

16. The converting system according to claim 10, wherein the control means charges the plurality of the charge current controlling capacitors respectively to mutually different voltages, and connects the respective charge current controlling capacitors in series to a charge current path for the respective power supplying capacitors to be in the same polarity as the DC power source, to minimize a potential difference between the predetermined voltages of the power supplying capacitors and the sum of a source voltage and charged voltages of an optional number of the charge current controlling capacitors.

17. The converting system according to claim 10, wherein the first inductor is provided for varying the inductance so as to charge the respective power supplying capacitors to mutually different voltages higher than a voltage of the power source.

18. The converting system according to claim 17, which further comprises a plurality of first inductor controlling switching means connected in series to the first inductor, and an inductance means including a parallel connection of series circuits of the first inductor and the respective first inductor controlling switching means, the first inductor controlling switching means being respectively optionally turned ON and OFF for varying the inductance of the first inductor.

19. The converting system according to claim 17, further comprising an inductance means including a series connection of parallel circuits of a first inductor controlling switching means connected in parallel to the first inductor and a second inductor controlling switching means for the second inductor, the first and second inductor controlling switching means being respectively optionally turned ON and OFF for varying the inductance of the first inductor.

20. The converting system according to claim 1, wherein the plurality of switching elements comprise respectively two MOSFETs each having a body diode and mutually connected at least at one of their source electrodes and drain electrodes, and a MOSFET controlling means for turning ON each of the two MOSFETs without turning them on simultaneously.

21. The converting system according to claim 20, wherein the MOSFETs are of a vertical structure type and are mutually connected at their drain electrodes.

22. The converting system according to claim 1, wherein the plurality of switching elements comprise respectively two bipolar transistors mutually connected at least at one of their emitter electrodes and collector electrodes, and a diode connected in inverse parallel between the emitter and collector of each of the two bipolar transistors.

23. The converting system according to claim 1, wherein the plurality of switching elements comprise respectively two MOSFETs having no body diode and mutually connected at their drain and source electrodes, and a diode connected in inverse parallel between the drain and source of each of the two MOSFETs.

24. The converting system according to claim 21, wherein the load comprises at least a bridge circuit including a plurality of switching elements, the load-use capacitor and a second inductor.

25. The converting system according to claim 10, wherein the charging means is arranged for connecting in series the charge current controlling capacitor to a charging current path for each of the power supplying capacitors to render the charge current controlling capacitor to be the same polarity as the DC power source when the charging current controlling capacitor is charged to a predetermined voltage, and charging the respective power supplying capacitors sequentially from one having a higher predetermined voltage value for the respective capacitors, and the charging current controlling capacitor has a low capacity value which decreases its own voltage due to a discharge.

26. The converting system according to claim 25, wherein the charging current controlling capacitor has an initial stage voltage value settable to be higher than the voltage value of the DC power source.

27. The converting system according to claim 25, wherein the charging means is arranged for minimizing a difference between a total voltage value of the DC power source and charging current controlling capacitor and a predetermined total voltage value of the respective power supplying capacitors, and charging the respective power supplying capacitors to the predetermined voltage value.

28. The converting system according to claim 25, further comprising means for enabling it possible to reduce voltages applied to the respective power supplying capacitors upon charging these power supplying capacitors to the predetermined voltages, so as to render the current to be zero.

29. The converting system according to claim 1, wherein the control circuit includes means for controlling the switching elements respectively inserted between the series circuit of the load-use capacitor and inductor so that a resonance frequency of a closed circuit formed upon turning ON of either one of the switching elements will be lower than a frequency of a voltage generated across both ends of the load.

* * * * *